US008980956B2

(12) United States Patent
Driver et al.

(10) Patent No.: US 8,980,956 B2
(45) Date of Patent: Mar. 17, 2015

(54) METHODS FOR PRODUCING BIOCOMPATIBLE MATERIALS

(75) Inventors: Michael Driver, Basingstoke (GB); Qingpu Hou, Basingstoke (GB); Jin Hai Wang, Baskingstoke (GB)

(73) Assignee: Vertellus Specialities Inc., Indianapolis, IN (US)

( * ) Notice: Subject to any disclaimer, the term of this patent is extended or adjusted under 35 U.S.C. 154(b) by 0 days.

(21) Appl. No.: 13/601,067

(22) Filed: Aug. 31, 2012

(65) Prior Publication Data

US 2013/0059926 A1 Mar. 7, 2013

Related U.S. Application Data

(60) Provisional application No. 61/530,121, filed on Sep. 1, 2011, provisional application No. 61/558,063, filed on Nov. 10, 2011.

(30) Foreign Application Priority Data

Sep. 1, 2011 (GB) .................................. 1115112.3
Nov. 10, 2011 (GB) .................................. 1119366.1

(51) Int. Cl.
C08F 30/08 (2006.01)
C08L 83/07 (2006.01)
C08F 30/02 (2006.01)
C08L 85/02 (2006.01)
A61K 47/32 (2006.01)
A01N 25/10 (2006.01)
G02B 1/04 (2006.01)
C08F 220/28 (2006.01)
C08F 230/02 (2006.01)
C08F 230/08 (2006.01)
C08F 290/06 (2006.01)
C08F 236/20 (2006.01)
C08F 236/22 (2006.01)
C08F 283/12 (2006.01)

(52) U.S. Cl.
CPC .............. G02B 1/043 (2013.01); C08F 220/28 (2013.01); C08F 230/02 (2013.01); C08F 230/08 (2013.01); C08F 290/068 (2013.01); C08F 290/062 (2013.01); C08F 236/20 (2013.01); C08F 236/22 (2013.01); C08F 283/124 (2013.01)
USPC ........ 514/772.4; 526/279; 526/277; 524/547; 523/106

(58) Field of Classification Search
CPC ............ G02B 1/00; G02B 1/04; G02B 1/043; G02C 7/04; A61F 2/14; A61F 2/16
See application file for complete search history.

(56) References Cited

U.S. PATENT DOCUMENTS

| | | | |
|---|---|---|---|
| 3,808,178 A | 4/1974 | Gaylord | |
| 4,120,570 A | 10/1978 | Gaylord | |
| 4,136,250 A | 1/1979 | Mueller et al. | |
| 4,153,641 A | 5/1979 | Deichert et al. | |
| 4,417,066 A | 11/1983 | Westall | |
| 4,740,533 A | 4/1988 | Su et al. | |
| 5,034,461 A | 7/1991 | Lai et al. | |
| 5,070,215 A | 12/1991 | Bambury et al. | |
| 5,270,415 A * | 12/1993 | Sulc et al. | 526/265 |
| 5,648,442 A * | 7/1997 | Bowers et al. | 526/277 |
| 6,090,901 A * | 7/2000 | Bowers et al. | 526/277 |
| 6,200,626 B1 * | 3/2001 | Grobe et al. | 427/2.24 |
| 6,743,878 B2 * | 6/2004 | Stratford et al. | 526/277 |
| 6,767,979 B1 * | 7/2004 | Muir et al. | 526/262 |
| 6,780,930 B2 * | 8/2004 | Lewis et al. | 524/800 |
| 6,828,029 B1 | 12/2004 | Lewis et al. | |
| 7,268,198 B2 | 9/2007 | Kunzler et al. | |
| 7,540,609 B2 | 6/2009 | Chen et al. | |
| 2002/0165324 A1* | 11/2002 | Bowers et al. | 525/326.9 |
| 2003/0152786 A1* | 8/2003 | Lewis et al. | 428/447 |
| 2004/0208985 A1* | 10/2004 | Rowan et al. | 427/2.25 |
| 2004/0256232 A1 | 12/2004 | Jiang et al. | |
| 2006/0012751 A1* | 1/2006 | Rosenzweig et al. | 351/160 R |
| 2007/0099868 A1 | 5/2007 | Harats et al. | |
| 2007/0296914 A1 | 12/2007 | Hong et al. | |
| 2009/0130295 A1 | 5/2009 | Broguiere et al. | |
| 2009/0304770 A1* | 12/2009 | Lewis et al. | 424/423 |
| 2010/0048515 A1 | 2/2010 | Harats et al. | |
| 2011/0319583 A1 | 12/2011 | Matsuoka et al. | |
| 2012/0136087 A1* | 5/2012 | Parakka et al. | 523/107 |

FOREIGN PATENT DOCUMENTS

DE 1211156 2/1966
EP 0080539 11/1981

(Continued)

OTHER PUBLICATIONS

Machine-generated English-language translation of JP-2000-169526, translation generated Mar. 2014, 16 pages.*
Machine-generated English-language translation of WO-2010055914, translation generated Mar. 2014, 25 pages.*
Thomson Scientific, London, GB; AN 2007-180957, XP002686152, & JP 2007 009060 A (Nippon Oils & Fats Co Ltd) Jan. 18, 2007. (Abstract Only).
Lewis A L et al: "Crosslinkable coatings from phosphorylcholine-based polymers", Biomaterials, Elsevier Science Publishers BV., Barking, GB, vol. 22, No. 2, Jan. 15, 2001, pp. 99-111, XP004236384.
Koinuma, Yasumi et al: "Diester monomer, its polymer, watercontaining soft contact", 1994, XP002687478. (Abstract Only).

(Continued)

Primary Examiner — Robert S Loewe
(74) Attorney, Agent, or Firm — Barnes & Thornburg LLP

(57) ABSTRACT

A method for producing polymerizable solution which comprises dissolving an ethylenically unsaturated zwitterionic monomer in a co-monomer system comprising a functionalized ethylenically unsaturated monomer in which the zwitterionic monomer is soluble, a siloxane group-containing monomer or macromer, and a crosslinking agent is disclosed. The polymerizable solution is biocompatible and can be used to produce polymers and articles such as contact lenses.

29 Claims, No Drawings

(56) References Cited

FOREIGN PATENT DOCUMENTS

| | | | |
|---|---|---|---|
| EP | 0 537 972 | 4/1993 | |
| EP | 0580435 | 1/1994 | |
| EP | 0767212 | 4/1997 | |
| EP | 0730599 | 4/2000 | |
| EP | 1122258 | 8/2001 | |
| EP | 2 407 493 | 1/2012 | |
| JP | 7 072430 | 3/1995 | |
| JP | 2000169526 A * | 6/2000 | ............ C08F 230/02 |
| JP | 2000-186117 | 7/2000 | |
| JP | 2007-9060 | 1/2007 | |
| WO | WO 92/07885 | 5/1992 | |
| WO | WO 96/31566 | 10/1996 | |
| WO | WO 2010055914 * | 5/2010 | ............ G02C 7/04 |
| WO | WO 2010104000 A1 * | 9/2010 | ............ C08F 130/08 |
| WO | WO 2010/147779 | 12/2010 | |
| WO | WO 2012/045080 | 5/2012 | |
| WO | WO 2012/104349 | 8/2012 | |

OTHER PUBLICATIONS

Suzuki, Hiroshi et al: "Preparation of polymerizable phosphorylcholine derivatives with medical applications", 1995, XP002687479. (Abstract Only).

Nakabayashi, Nobuo et al: "Low-toxicity aqueous solution of phosphorylcholine group-bearing polymer and its manufacture", 1996, XP002687480. (Abstract Only).

Harats, Dror et al: "Oxidized lipids and uses thereof in the treatment of inflammatory diseases and disorders", 2010, XP002687481. (Abstract Only).

Harats, Dror et al: "Oxidized lipids and uses thereof in the treatment of inflammatory diseases and disorders", 2007, XP002687482. (Abstract Only).

Ol'dekop, Y: "XRN 3984136", XP55044654,accession No. XRN 3984136 Database accession No. XRN 3984136 ; & Y Ordekop: "Reaxys XRN = 3984136", Zhurnal Organicheskoi Khimii, vol. 15, No. 1, Jan. 1, 1979, pp. 39-50.

Raghavan S et al: "A novel, easy and mild preparation of sulfilimines from sulfoxides using the Burgess reagent", Tetrahedron Letters, Elsevier, Amsterdam, NL, vol. 49, No. 27, Jun. 30, 2008, pp. 4256-4259,XP022695656.

Kita, Noriyasu et al: "Imidazole derivative and silver halide photographic material spectrally sensitized with the compound", 1997, XP002687483. (Abstract Only).

Anton P et al: "Synthesis of polymeric surfactants by radical thiol/en addition reaction", European Polymer Journal, Pergamon Press Ltd. Oxford, GB, vol. 31, No. 4, Apr. 1, 1995, pp. 387-394.

Koberle and A Laschewsky P: "Hydrophobically Modified Zwitterionic Polymers : Synthesis, Bulk Properties, and Miscibility with Inorganic Salts".Macromolecules, American Chemical Society,Washington, DC; US,vol. 27, Jan. 1, 1994. pp. 2165-2173.

Kupetis, G. et al: "Unsaturated compounds of a pyridine series. (2. Synthesis of sulfobetaines of unsaturated esters of nicotinic acid)", 1985, XP002687484. (Abstract Only).

Emerson Poley Peqanha et al: "Synthesis and pharmacological evaluation of a new class of bicyclic phospholipids, designed as platelet activating factor antagonists", Il Farmaco, vol. 53, No. 5, May 1, 1998, pp. 327-336.

Bayer A.G.: "XRN 4028356", XP002687591 ,accession No. XRN 4028356 Database accession No. XRN 4028356 ; & DE 12 11 156 B (Bayer AG) Feb. 24, 1966.

Sato, Toshihiro et al: "Ammonium phosphate-containing polymers, lenses using them, and their manufacture", 2000, XP002687477. (Abstract Only).

Nakayama, Takafumi et al: "Presensitized lithographic plates and ethylenic polymers with betaine structures for them", XP002687485, retrieved from STN Database accession No. 2012:338275, abstract.

Bowen, Martina E. et al: "Aqueous fire-fighting foams with reduced fluorine content",(Apr. 5, 2012) XP002687486. (Abstract Only).

Lewis, Andrew L. "Phosphorylcholine-based polymers and their use in the prevention of biofouling." *Colloids and Surfaces B: Biointerfaces* 18.3 (2000): 261-275.

Guillon, Jean-Pierre, Judith Morris, and Brenda Hall. "Evaluation of the pre-lens tear film forming on three disposable contact lenses." *Lacrimal Gland, Tear Film, and Dry Eye Syndromes 3*, 2002.

Umeda, Takashi, Tadao Nakaya, and Minoru lmoto. "Polymeric phospholipid analogues, 14. The convenient preparation of a vinyl monomer containing a phospholipid analogue." *Die Makromolekulare Chemie, Rapid Communications* 3.7 (1982): 457-459.

Thuong, NT; Chabrier, P. Nouvelle Methode de Preparation de la Phosphorylcholine, de la Phosphorylhomo-choline et de leura WrivBs. Bull. Chem. SOC. Fr. 1974,667-671.

International Search Report for PCT US2012 053372, 2012.
International Search Report for PCT US2012 053370, 2012.
International Search Report for PCT US20120 53373, 2012.
Suzuki, EPO Abstract of JP 2007-9060.

\* cited by examiner

METHODS FOR PRODUCING BIOCOMPATIBLE MATERIALS

CROSS-REFERENCE TO RELATED APPLICATIONS

This application claims the benefit of U.S. Provisional Application No. 61/530,121, filed Sep. 1, 2011, and U.S. Provisional Application No. 61/558,063, filed Nov. 10, 2011, under 35 U.S.C. §119(e), and UK Application No. 1115112.3, filed on Sep. 1, 2011, and UK Application No. 1119366.1, filed on Nov. 10, 2011, under 35 U.S.C. §119(a), the disclosures of each of which are incorporated by reference herein in their entireties.

INTRODUCTION

This invention relates to methods for producing biocompatible materials, in particular polymerisable mixtures, polymers and articles formed therefrom. The materials of the present invention are useful in the manufacture of products in which an appropriate combination of gas permeability and hydrophilicity is required. These include ophthalmic devices, such as contact lenses and membranes and films used in wound dressings and sensor systems, for example.

BACKGROUND ART

Materials used in the manufacture of medical devices which are to be used in contact with protein-containing or biological fluids are selected on the basis of acceptable physical and mechanical properties and compatibility with the protein-containing or biological fluid. However, it is often difficult to optimise all of these properties simultaneously and so a compromise must be reached which often results in sub-optimal performance.

As an example, early gas permeable contact lenses were formed from silicones and, as a consequence, had a very low water content and were relatively rigid. The hydrophobic nature of silicone materials meant that the lenses were poorly wettable and had a tendency to stick to the eye. Furthermore, while lenses formed from silicones have a high oxygen permeability, the low water content of such materials means that they can be uncomfortable for the wearer. Hence, the focus then shifted to hydrogel systems incorporating hydrophilic monomers such as 2-hydroxyethylmethacrylate (HEMA), N-vinyl pyrrolidone and methacrylic acid. Hydrogel systems have a significant water content, frequently above 30%, and, as a result, are more comfortable for the wearer. However, the oxygen permeability of these materials generally is not as high as it is for silicones which increases the risk of damage to the eye as a result of hypoxia. In this regard, the oxygen permeability of these hydrogel lenses may be sufficient for daily use but is not generally suitable for extended wear.

Therefore, more recently, the focus has been on developing materials with a balance of properties, primarily the oxygen permeability associated with silicone materials, and the water content, wettability and lower modulus associated with hydrogel systems. Achieving the correct balance of properties is important to ensure minimum risk to ocular health and good tear film stability which is essential for comfort. Currently the materials of choice are silicone hydrogels, although these are not ideal because, although they contain water, the materials are inherently hydrophobic and are poorly wettable. Efforts have been made to improve the wettability of these materials. For example, manufacturers have used plasma treatments to modify surface properties in order to increase surface wettability. However, a disadvantage of such approaches is that it introduces additional steps in to the manufacturing process which may be difficult to control.

Clearly, as the contact lenses will be in contact with the surface of the eye, a further important consideration is the biocompatibility of the lens material. It is of utmost importance that the silicone hydrogels used to form contact lenses do not elicit any unwanted biological response. As silicone materials are inherently hydrophobic this is a particular challenge because hydrophobicity causes the tear film of the eye to break up leading to discomfort, and in addition, may encourage the deposition of tear film components such as proteins and lipids Hence, there is a need for biocompatible materials which provide biocompatibility together with both high gas, in particular oxygen, permeability and an appropriate water content and surface wettability to provide a lens with suitable mechanical properties and level of on-eye comfort.

As described above, polymerisable ethylenically unsaturated components, such as methacrylic acid and ester derivatives thereof, have been used to manufacture ophthalmic lenses, and much effort has been devoted to copolymerise such unsaturated systems with biocompatible co-monomers to produce lens materials with improved biocompatibility. Polymerisable zwitterionic materials, in particular, 2-(methacryloyloxyethyl)-2'(trimethylammonium ethyl)phosphate, inner salt (MPC), have been used to form biocompatible polymers. These materials contain the zwitterionic phosphorylcholine (PC) group and the biocompatibility of these materials is derived from the fact that this PC group mimics the zwitterionic structure of phospholipids such as phosphatidylcholine and sphingomyelin which are the major components of the outer membrane of all living cells. Contact lens materials incorporating MPC (EP 0555295) have been shown to possess beneficial properties, including reduced dehydration on eye and reduced deposition of tear film components (Guillon J P, et al., Adv. Exp. Med. Biol, 2002, 506 (Part B), 901-15). More generally, polymers containing zwitterionic groups have been shown to improve biocompatibility by reducing protein deposition, blood activation, inflammatory reactions, bacterial adhesion and inhibiting biofilm formation (see Lewis, A L, Colloids and Surfaces B: Biointerfaces 18 (2000) 261-275, and references therein).

However, a disadvantage of MPC and related zwitterionic materials is that they are frequently solids with very limited solubility. This places limitations on the utility of MPC and other zwitterions as components in lens formulations. Indeed, to date, the incorporation of these zwitterionic monomers into silicone hydrogel formulations which comprise siloxane co-monomers has not been possible due to the inherent poor solubility of MPC in these liquid co-monomers and the tendency of the derived siloxane-zwitterion polymers to be opaque due to microphase separation.

Accordingly, there is a need for a method by means of which it is possible to incorporate zwitterionic monomers, in particular MPC, into mixtures containing monomer units having a siloxane functionality, thus making it possible to produce polymers useful for forming ophthalmic devices, in particular contact lenses with beneficial properties.

Against this background, the present invention provides a method for producing a polymerisable solution which can be polymerised to produce a polymer which comprises both a zwitterionic functionality and a siloxane functionality.

Accordingly, in a first aspect, the present invention provides a method which comprises dissolving an ethylenically unsaturated zwitterionic monomer in a co-monomer system comprising a functionalised ethylenically unsaturated solubilising monomer in which the zwitterionic monomer is soluble, a siloxane group-containing monomer or macromer, and a cross-linking agent, to produce a polymerisable solution.

As described above, ethylenically unsaturated zwitterionic monomers, such as MPC are insoluble in many of the commonly used liquid components used to form silicone hydrogels. In addition, attempts to polymerise such compositions results in microphase separation, leading to opaque polymers, unsuitable for use as ophthalmic devices. However, the present inventors have found that it is possible to dissolve an ethylenically unsaturated zwitterionic monomer, for example MPC, in a suitable functionalised ethylenically unsaturated solubilising monomer such as HEMA or other suitable solubilising monomer to produce a solution, and by careful selection of the nature and content of the components present in the co-monomer system, thus overcome these problems.

In particular, it is possible to incorporate zwitterionic monomers into formulations containing siloxane components, wherein the resulting polymerisable solution is clear and which produces a clear polymer after polymerisation and after hydration of the polymer to form the hydrogel. Furthermore, because the functionalised ethylenically unsaturated solubilising monomer can be a component such as HEMA, glycerylmethacrylate (GMA) or methacrylic acid which may be desirable for inclusion into a polymer which will ultimately be used in an ophthalmic application, the method does not require the addition of non-reactive solvating components which would not so conveniently be present in the formation of such polymers. Therefore, it is not necessary for the method to be complicated by further steps in which it is necessary to remove the solvent which has been used to solubilise the ethylenically unsaturated zwitterionic monomer.

A further advantage is that the material which results from polymerisation and subsequent hydration of the polymerisable solution obtainable by the method of the present invention is also clear and homogeneous.

The method of the present invention involves dissolving the zwitterionic monomer in a co-monomer system which comprises a functionalised ethylenically unsaturated solubilising monomer in which the zwitterionic monomer is soluble, a siloxane group-containing monomer or macromer, and a cross-linking agent. The result is a polymerisable solution which is homogeneous. The term "homogeneous" is used herein to describe a solution which is a single phase i.e. a solution which appears visibly to consist of a single phase. The fact that a homogeneous solution may be obtained is surprising given that a hydrophilic component (the zwitterionic monomer) is being mixed with a hydrophobic component (the siloxane group-containing monomer or macromer).

The ethylenically unsaturated zwitterionic monomer which is dissolved in the co-solvent system is a monomer which comprises an ethylenically unsaturated group and a zwitterionic group. In one embodiment, the ethylenically unsaturated zwitterionic monomer is a monomer of formula (I):

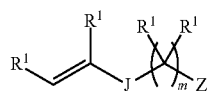

(I)

wherein:
J is selected from the group consisting of
   a valence bond;
   —W—X—Y—, wherein W is $(CR^1_2)_n$; X is O, S or $NR^2$ and Y is a linker group; and
   —K—X—Y—, wherein K is $(CR^1_2)_nC(O)$; X is O, S or $NR^2$ and Y is a linker group;

Z is a zwitterionic group;
each $R^1$ is independently selected from H, halogen, $C_{1-4}$ alkyl or $C_{1-4}$ haloalkyl;
$R^2$ is H or $C_{1-4}$ alkyl;
n is an integer from 0 to 6; and
m is an integer from 0 to 6.

Although formula (I) (and the chemical formulae which follow herein) are represented without any indication of specific stereochemistry, the skilled person will understand that a number of possible isomers are possible. In this regard, the present invention includes within its scope, all possible stereoisomers of the chemical structures depicted.

In one embodiment, the ethylenically unsaturated zwitterionic monomer is a monomer of formula (I), wherein J is a valence bond, each $R^1$ is hydrogen and m is 1.

In one embodiment, the ethylenically unsaturated zwitterionic monomer is a monomer of formula (II):

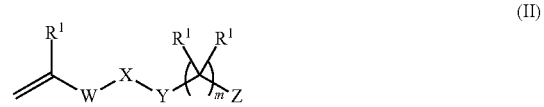

(II)

wherein W, X, Y, Z, $R^1$ and m are as defined above.

The value of n may be 0, 1, 2, 3, 4, 5 or 6. In a preferred embodiment, n is 0. In an alternative embodiment, n is 1. In a further embodiment, n is 2. Where n is 0, the vinyl group is adjacent to the heteroatom which means that the lone pair of electrons on the heteroatom can interact with the electrons in the vinyl group which has the effect of increasing the reactivity of the monomer.

In one embodiment, $R^1$ is hydrogen. In an alternative embodiment, $R^1$ is $C_{1-4}$ alkyl, in particular ethyl or methyl, in particular methyl. In an alternative embodiment, $R^1$ may be halogen, in particular fluorine. In an alternative embodiment, $R^1$ may be a $C_{1-4}$ haloalkyl group, wherein one or more of the hydrogen atoms in the alkyl group is substituted with a halogen, in particular fluorine. An example of a $C_{1-4}$ haloalkyl group is $CF_3$. Each $R^1$ group may be the same or different. In one embodiment, the $R^1$ groups are different. In one embodiment, the $R^1$ groups are the same. For example, when n is 1, each of the two $R^1$ groups bound to the carbon atom may be the same or different. Similarly, when n is 2, each of the four $R^1$ groups may be the same or different. Similarly, when n is 1 and m is 1, each of the four $R^1$ groups may be the same or different.

In one embodiment, X is O. In alternative embodiment, X is S. In a further embodiment, X is $NR^2$. In one embodiment, $R^2$ is hydrogen. In one embodiment, $R^2$ is $C_{1-4}$ alkyl, in particular ethyl or methyl, in particular methyl.

Y is a linker group which forms a link between the heteroatom X and the $(CR^1_2)_mZ$ group in the monomer of formula (I) or formula (II). The nature of group Y is not particularly limited and in a preferred embodiment, Y is selected from the group consisting of $C_{1-10}$ alkylene, $C_{2-10}$ alkenylene, $C_{2-10}$ alkynylene, $C_{3-10}$ cycloalkylene, $C_{3-10}$ cycloalkenylene, $C_{1-10}$ heteroalkylene, $C_{2-10}$ heteroalkenylene, $C_{2-10}$ heteroalkynylene, arylene, heteroarylene, —C(O)—, —C(S)—, —C(O)O—, —C(O)S—, —C(O)N($R^M$)—, —C(S)—, —C(S)O—, —C(S)S— and —C(S)N($R^M$)—, wherein $R^M$ is hydrogen or $C_{1-4}$ alkyl. The alkylene, alkenylene, alkynylene, cycloalkylene, cycloalkenylene, heteroalkylene, heteroalkenylene, heteroalkynylene, arylene and heteroarylene groups may be optionally substituted with one or more $R^N$, wherein each $R^N$ is independently selected from the group consisting of —H, —OH, —CN, —NO$_2$, —CF$_3$, —OCF$_3$, —CO$_2$H, —NH$_2$, C$_1$-C$_{10}$ alkyl, C$_2$-C$_{10}$ alkenyl, C$_2$-C$_{10}$ alkynyl, —O(C$_1$-C$_{10}$ alkyl), —O(C$_2$-C$_{10}$ alkenyl), —O(C$_2$-C$_{10}$ alkynyl), halogen, —C(O)H, —C(O)—(C$_1$-C$_{10}$ alkyl), —C(O)—O(C$_1$-C$_{10}$ alkyl), —NH(C$_1$-C$_{10}$ alkyl), —N(C$_1$-C$_{10}$ alkyl)$_2$, —C(O)—NH(C$_1$-C$_{10}$ alkyl), —C(O)—N(C$_1$-C$_{10}$ alkyl)$_2$, —NH—C(O)—(C$_1$-C$_{10}$ alkyl), —NH(C$_1$-C$_{10}$ alkyl)-C(O)—(C$_1$-C$_{10}$ alkyl), —NH—S(O)$_2$—(C$_1$-C$_{10}$ alkyl), —NH—(C$_1$-C$_{10}$ alkyl)-S(O)$_2$—(C$_1$-C$_{10}$ alkyl), —(C$_0$-C$_{10}$)—SH, —S(O)—(C$_1$-C$_{10}$ alkyl), —S(O)$_2$—(C$_1$-C$_{10}$ alkyl), —S(O)$_2$—NH$_2$, —S(O)$_2$—NH—(C$_1$-C$_{10}$ alkyl), —S(O)$_2$—N(C$_1$-C$_{10}$ alkyl)$_2$ and =O.

In one embodiment, Y is a C$_{1-10}$ alkylene, C$_{2-10}$ alkenylene or C$_{2-10}$ alkynylene optionally substituted with one or more R$^N$. In a further embodiment, Y is C$_{1-6}$ alkylene, C$_{2-6}$ alkenylene or C$_{2-6}$ alkynylene optionally substituted with one or more R$^N$. In a further embodiment, Y is C$_{1-10}$ alkylene, in one instance C$_{1-6}$ alkylene optionally substituted with one or more R$^N$.

In an alternative embodiment, Y is —C(=V)A-, wherein V is S or O and A is selected from NR$^M$, O or S, wherein R$^M$ is H or C$_{1-4}$ alkyl. In particular, in one embodiment, the present invention provides a monomer of formula (IB):

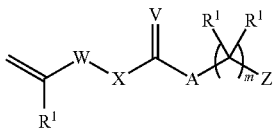

(IB)

wherein W, X and Z, R$^1$, R$^2$, n and m are as defined above in connection with formula (I), V is S or O; and A is selected from NR$^M$, O and S. Where the monomer of the present invention has formula (IB), preferably V is O and A is O such that Y as defined in formula (I) and formula (II) is —C(O)O—.

In the monomers of formula (I) and formula (II) wherein X is selected from NR$^2$, then R$^2$, Y and the N atom to which they are bonded taken together may form a 5 to 7 membered heterocyclic ring optionally substituted with one or more R$^N$, particularly wherein R$^N$ is O. In particular, R$^2$, Y and the N atom to which they are bonded taken together form a 5-membered heterocyclic ring be optionally substituted with one or more R$^N$, particularly wherein R$^N$ is O.

In one embodiment, the monomer has the formula (IA):

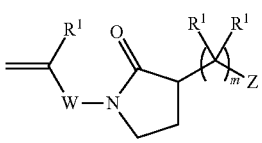

(IA)

wherein W, R$^1$ and Z are as defined above. In one embodiment, the monomer has the formula (IA), wherein n is 0 and hence the group W is not present.

In the monomers of formula (I), (IA), (IB) and (II), the value of m may be 0, 1, 2, 3, 4, 5 or 6. In one embodiment, m is 0.

In particular, in a monomer of formula (II), preferably m is 0 when Y is a group as defined above other than —C(O)—, —C(S)—, —C(O)O—, —C(O)S—, —C(O)N(R$^M$)—, —C(S)— or —C(S)N(R$^M$)—. In an alternative embodiment, in particular where Y is —C(O)—, —C(S)—, —C(O)O—, —C(O)S—, —C(O)N(R$^M$)—, —C(S)— or —C(S)N(R$^M$)—, m is 1 or 2.

In one embodiment, the ethylenically unsaturated zwitterionic monomer is an acrylic zwitterionic monomer of formula (ID):

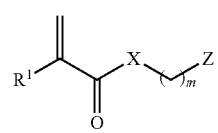

(ID)

wherein R$^1$, X, Z and m are as defined above.

In a preferred embodiment, the ethylenically unsaturated zwitterionic monomer is a monomer of formula (ID), wherein R$^1$ is methyl, X is O and m is 2.

In one embodiment, the ethylenically unsaturated zwitterionic monomer is a poly(ethylene glycol) derivative zwitterionic monomer of formula (III):

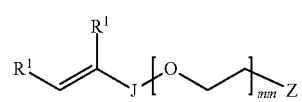

(III)

wherein R$^1$, J and Z are as defined above and mm is an integer in the range from 1 to 20. Preferably, mm is an integer in the range from 1 to 10.

In one embodiment, the ethylenically unsaturated zwitterionic monomer is a poly(ethylene glycol) derivative zwitterionic monomer of formula (IIIA):

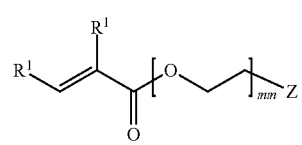

(IIIA)

In one embodiment, the ethylenically unsaturated zwitterionic monomer is a poly(ethylene glycol) derivative zwitterionic monomer of formula (IIIB):

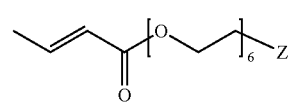

(IIIB)

wherein Z is a group of formula (IVB) as defined below, wherein all R$^4$ groups are methyl and b is 2.

Z is a zwitterionic group. A zwitterionic group is one which carries both a positive charge and a negative charge located on different atoms within the group such that the net charge of the group is zero. As a consequence, zwitterionic groups have a high polarity and a natural affinity for water. Phospholipids, such as phosphatidylcholine and sphingomyelin, which are the major components of the outer membrane of all living cells have a zwitterionic structure. Hence, the acrylic zwitterionic monomers can be used to produce polymers which mimic the zwitterionic structure of phospholipids. This results in the biocompatibility of the polymers which may be produced.

In one embodiment, Z is a zwitterionic group selected from the group consisting of formula (IVA), (IVB), (IVC), (IVD) and (IVE).

Preferably, Z is a zwitterionic group of formula (IVB).

Group (IVA) has the formula:

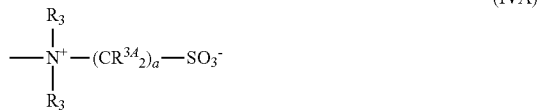

(IVA)

wherein each $R^3$ and $R^{3A}$ is independently selected from hydrogen and $C_{1-4}$ alkyl and a is an integer from 2 to 4.

In one embodiment, both $R^3$ groups are the same. In particular, both $R^3$ groups may be $C_{1-4}$ alkyl, in one embodiment, methyl.

In one embodiment, both $R^{3A}$ groups are the same. In particular, both $R^{3A}$ groups may be hydrogen.

In one embodiment, a is 2 or 3. In a further embodiment, a is 3.

In one embodiment where Z is a group of formula (IVA), m is 1 or 2.

Group (IVB) has the formula:

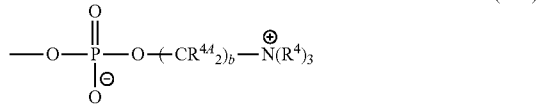

(IVB)

wherein each $R^4$ and $R^{4A}$ is independently selected from hydrogen and $C_{1-4}$ alkyl and b is an integer from 1 to 4;

In one embodiment, all $R^4$ groups are the same. In particular, all $R^4$ groups may be $C_{1-4}$ alkyl, in one embodiment, methyl. In one embodiment, at least one $R^4$ group is $C_{1-4}$ alkyl.

In one embodiment, the $R^{4A}$ groups are the same. In particular, the $R^{4A}$ groups may be hydrogen.

In one embodiment, b is 2 or 3. In a further embodiment, b is 2.

In one embodiment where Z is a group of formula (IVB), m in formula (I) is 1 or 2.

In one embodiment, preferably Z is a group of formula (IVB), wherein all $R^4$ groups are methyl groups and b is 2. In this embodiment, Z is a phosphorylcholine (PC) group. PC groups occur naturally in the phospholipids which form the membranes of all living cells. Therefore, with a view to mimicking the zwitterionic properties of phospholipids, it is particularly advantageous for Z to be a PC group.

Group (IVC) has the formula:

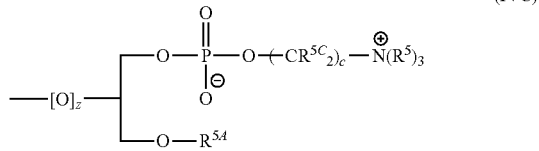

(IVC)

wherein each $R^5$ and $R^{5C}$ is independently selected from hydrogen and $C_{1-4}$ alkyl; $R^{5A}$ is hydrogen or a group —C(O)$B^1R^{5B}$, wherein $R^{5B}$ is hydrogen or methyl, $B^1$ is selected from the group consisting of a bond; $C_{1-10}$ alkylene, $C_{2-10}$ alkenylene, $C_{2-10}$ alkynylene, $C_{3-10}$ cycloalkylene, $C_{3-10}$ cycloalkenylene, $C_{1-10}$ heteroalkylene, $C_{2-10}$ heteroalkenylene, $C_{2-10}$ heteroalkynylene, arylene, heteroarylene, wherein the alkylene, alkenylene, alkynylene, cycloalkylene, cycloalkenylene, heteroalkylene, heteroalkenylene, heteroalkynylene, arylene and heteroarylene groups may be optionally substituted with one or more $R^N$ as defined previously, and c is an integer from 1 to 4, wherein if Z is directly bonded to an O or N atom, z is 0 and otherwise z is 1.

In one embodiment, the $R^5$ groups are the same. In particular, the $R^5$ groups may be $C_{1-4}$ alkyl, in one embodiment, methyl. In one embodiment, at least one $R^5$ group is $C_{1-4}$ alkyl.

In one embodiment, both $R^{5C}$ groups are the same. In particular, the $R^{5C}$ groups may be hydrogen.

In one embodiment, c is 2 or 3. In a further embodiment, c is 3.

Group (IVD) has the formula:

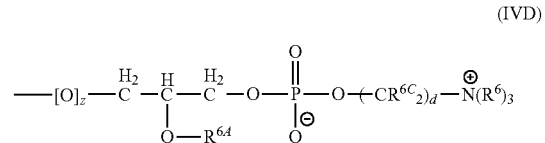

(IVD)

wherein each $R^6$ and $R^{6C}$ is independently selected from hydrogen and $C_{1-4}$ alkyl; $R^{6A}$ is hydrogen or a group —C(O)$B^2R^{6B}$, wherein $R^{6B}$ is hydrogen or methyl, $B^2$ is selected from the group consisting of a bond; $C_{1-10}$ alkylene, $C_{2-10}$ alkenylene, $C_{2-10}$ alkynylene, $C_{3-10}$ cycloalkylene, $C_{3-10}$ cycloalkenylene, $C_{1-10}$ heteroalkylene, $C_{2-10}$ heteroalkenylene, $C_{2-10}$ heteroalkynylene, arylene, heteroarylene, wherein the alkylene, alkenylene, alkynylene, cycloalkylene, cycloalkenylene, heteroalkylene, heteroalkenylene, heteroalkynylene, arylene and heteroarylene groups may be optionally substituted with one or more $R^N$ as defined previously, and d is an integer from 1 to 4, wherein if Z is directly bonded to an O or N atom, z is 0 and otherwise z is 1;

In one embodiment, the $R^6$ groups are the same. In particular, the $R^6$ groups may be $C_{1-4}$ alkyl, in one embodiment, methyl. In one embodiment, at least one $R^6$ group is $C_{1-4}$ alkyl.

In one embodiment, both $R^{6C}$ groups are the same. In particular, the $R^{6C}$ groups may be hydrogen.

In one embodiment, d is 1 or 2. In a further embodiment, d is 2.

Group (IVE) has the formula:

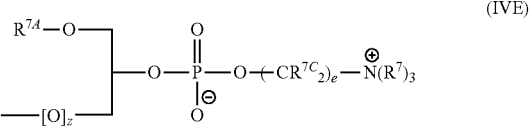

(IVE)

wherein each $R^7$ and $R^{7C}$ is independently selected from hydrogen and $C_{1-4}$ alkyl; $R^{7A}$ is hydrogen or a group —C(O)$B^2R^{7B}$, wherein $R^{7B}$ is hydrogen or methyl, $B^2$ is selected from the group consisting of a bond; $C_{1-10}$ alkylene, $C_{2-10}$ alkenylene, $C_{2-10}$ alkynylene, $C_{3-10}$ cycloalkylene, $C_{3-10}$ cycloalkenylene, $C_{1-10}$ heteroalkylene, $C_{2-10}$ heteroalkenylene, $C_{2-10}$ heteroalkynylene, arylene, heteroarylene, wherein the alkylene, alkenylene, alkynylene, cycloalkylene, cycloalkenylene, heteroalkylene, heteroalkenylene, heteroalkynylene, arylene and heteroarylene groups may be optionally substituted with one or more $R^N$ as defined previously, and e is an integer from 1 to 4, wherein if Z is directly bonded to an O or N atom, z is 0 and otherwise z is 1;

In one embodiment, the $R^7$ groups are the same. In particular, the $R^7$ groups may be $C_{1-4}$ alkyl, in one embodiment, methyl. In one embodiment, at least one $R^7$ group is $C_{1-4}$ alkyl.

In one embodiment, both $R^{7C}$ groups are the same. In particular, the $R^{7C}$ groups may be hydrogen.

In one embodiment, e is 1 or 2. In a further embodiment, e is 2.

Preferably, Z is a group of formula (IVB), in particular, a group of formula (IVB), wherein all $R^4$ groups are methyl groups and b is 2. In a particularly preferred embodiment, the ethylenically unsaturated zwitterionic monomer is a monomer of formula (ID), wherein $R^1$ is methyl, X is O, m is 2 and Z is a group of formula (IVB), wherein all $R^4$ groups are methyl groups and b is 2. In this embodiment, the ethylenically unsaturated zwitterionic monomer is 2-(methacryloyloxyethyl)-2'(trimethylammonium ethyl)phosphate, inner salt (MPC) (also known as hydroxyethyl methacrylate-phosphorylcholine, HEMA-PC).

An essential component of the co-solvent system in which the ethylenically unsaturated zwitterionic monomer is dissolved is a functionalised ethylenically unsaturated solubilising monomer in which the zwitterionic monomer is soluble. This ensures that a clear homogeneous polymerisable solution is obtained. The term "functionalised" is used herein to mean that the ethylenically unsaturated monomer has a terminal functional group, wherein the functional group is selected from the group consisting of —OH, —$NR^P_2$, —$C(O)OR^P$ and —$C(O)NR^P_2$, wherein each $R^P$ is independently selected from H and $C_{1-6}$ alkyl. In one embodiment, the functionalised ethylenically unsaturated solubilising monomer is a hydroxylated ethylenically unsaturated monomer.

Preferably, the functionalised ethylenically unsaturated solubilising monomer is an acrylic acid or ester thereof. Examples include methacrylic acid, acrylic acid, hydroxybutyl methacrylate, hydroxypropyl methacrylate, hydroxybutyl acrylate, hydroxypropyl acrylate, hydroxyethyl methacrylate (HEMA), hydroxyethyl acrylate and glycerol methacrylate (GMA).

Preferably the functionalised ethylenically unsaturated solubilising monomer is hydroxyethylmethacrylate (HEMA) or glycerol methacrylate (GMA). However, although the description which follows focuses on HEMA or GMA, the descriptions apply equally to other functionalised ethylenically unsaturated solubilising monomers in which the zwitterionic monomer is soluble.

As used herein, the term "soluble" means that the zwitterionic monomer forms a mixture with the functionalised ethylenically unsaturated solubilising monomer wherein the mixture exhibits the same or substantially the same values of physical properties throughout the mixture, i.e. the mixture comprises an essentially single phase and/or is essentially homogeneous. Conveniently, solubility can be assessed by light scattering. For a monomer A which is soluble in monomer B, the addition of monomer A to monomer B results in essentially no change in light scattering. An essentially single phase mixture is characterised by high optical clarity. The boundary between an essentially single phase mixture and a mixture with two (or more) phases is defined by the "cloud point" which, for a given monomer blend, is defined as the temperature at which phase separation is observed. Clarity may be assessed on the macro-scale by eye.

In some embodiments, dissolution of the ethylenically unsaturated zwitterionic monomer in the co-monomer system may be accelerated by agitation such as stirring and/or shaking. Heat may also be applied, although care must be taken to control the temperature such that premature polymerisation does not occur.

In one embodiment of the method of the present invention, the speed of dissolution of the ethylenically unsaturated zwitterionic monomer in the co-solvent system may be accelerated by pre-dissolving the ethylenically unsaturated zwitterionic monomer in the functionalised ethylenically unsaturated solubilising monomer in which is it soluble prior to mixing with the other components of the co-monomer system.

The other essential components which comprise the co-monomer system in which the zwitterionic monomer is dissolved are a siloxane group-containing monomer or macromer and a cross-linking agent. In this regard, the co-monomer system comprises components which are used conventionally to form silicone hydrogel polymers useful in the production of ophthalmic devices.

The term "macromer" is used to refer to a low molecular weight polymer having at least one polymerisable end group and a degree of polymerisation (DP) ranging from 2 to 1000 monomeric repeat units and/or having a number average molecular weight range from approximately 100 to 100,000 Daltons.

It is the presence of the siloxane groups in the polymers which can be synthesized from the polymerisable solution which is made by the method of the present invention which contributes to high oxygen permeability, an important consideration for ophthalmic devices, in particular contact lenses. However, the hydrophobic nature of siloxane components has, to date, resulted in microphase separation when attempts have been made to incorporate zwitterionic monomers. This is a problem which has been overcome by the method of the present invention.

A siloxane group-containing component is one which includes the residue having the general structure —[Si(R)$_2$O]—, wherein R is hydrogen or a $C_{1-10}$ alkylene, $C_{2-10}$ alkenylene, $C_{2-10}$ alkynylene, $C_{3-10}$ cycloalkylene, $C_{3-10}$ cycloalkenylene, $C_{1-10}$ heteroalkylene, $C_{2-10}$ heteroalkenylene, $C_{2-10}$ heteroalkynylene, arylene, heteroarylene group. Preferably R is a $C_{1-10}$ alkylene group, preferably a $C_1$ alkylene group. Preferably, the Si and attached O are present in the siloxane group-containing monomer or macromer in an amount greater than 20 weight percent, and more preferably greater than 30 weight percent of the total molecular weight of the siloxane group-containing monomer or macromer.

Useful siloxane group-containing monomer or macromer may comprise polymerizable functional groups such as acrylate, methacrylate, acrylamide, methacrylamide, N-vinyl lactam, N-vinylamide, and styryl functional groups. Examples of siloxane group-containing components which may be included in the co-solvent system are described in U.S. Pat. No. 3,808,178, U.S. Pat. No. 4,120,570, U.S. Pat. No. 4,136,250, U.S. Pat. No. 4,153,641, U.S. Pat. No. 4,740,533, U.S. Pat. No. 5,034,461, U.S. Pat. No. 5,070,215 and EP 080539. All of the patents cited herein are hereby incorporated in their entireties by reference.

In one embodiment of the present invention, the siloxane group-containing monomer may be a polysiloxanylalkyl (meth)acrylic monomer represented by the following formula X:

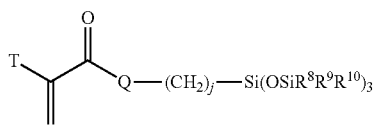

(Formula X)

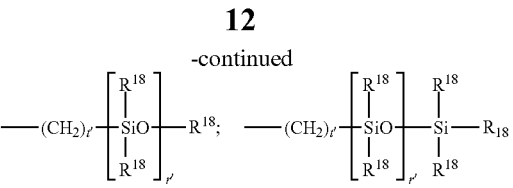

wherein: T denotes H or lower alkyl and in certain embodiments H or methyl; Q denotes O or $NR^{12}$; each $R^{12}$ independently denotes hydrogen or methyl, each $R^8$, $R^9$ and $R^{10}$ independently denotes a lower alkyl radical or a phenyl radical, and j is 1 or 3 to 10. Examples of these polysiloxanylalkyl (meth)acrylic monomers include methacryloxypropyl tris(trimethylsiloxy)silane, pentamethyldisiloxanyl methylmethacrylate, and methyldi(trimethylsiloxy)methacryloxymethyl silane.

An alternative class of siloxane group-containing components which may form a part of the co-solvent system are poly(organosiloxane) prepolymers represented by Formula XI:

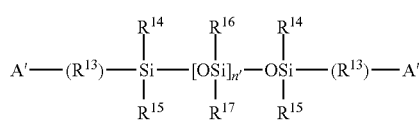

(Formula XI)

wherein: each A' independently denotes an activated unsaturated group, such as an ester or amide of an acrylic or a methacrylic acid or an alkyl or aryl group (providing that at least one A' comprises an activated unsaturated group capable of undergoing radical polymerization); each of $R^{14}$, $R^{15}$, $R^{16}$ and $R^{17}$ are independently selected from the group consisting of a monovalent hydrocarbon radical or a halogen substituted monovalent hydrocarbon radical having 1 to 18 carbon atoms which may have ether linkages between carbon atoms; $R^{13}$ denotes a divalent hydrocarbon radical having from 1 to 22 carbon atoms, and n' is 0 or an integer greater than or equal to 1, in one embodiment n' is 5 to 400, in another embodiment n' is 10 to 300. One specific example is α,ω-bismethacryloxypropyl poly-dimethylsiloxane. Another example is mPDMS (monomethacryloxypropyl terminated mono-n-butyl terminated polydimethylsiloxane).

Another useful class of siloxane group-containing components includes silicone-containing vinyl carbonate or vinyl carbamate monomers of the following formula XII:

(Formula XII)

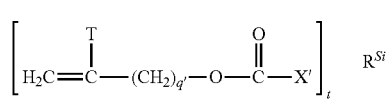

wherein: X' denotes O, S or NH; $R^{Si}$ denotes a silicone-containing organic radical; T denotes hydrogen or lower alkyl, in certain embodiments H or methyl; t is 1, 2, 3 or 4; and q' is 0 or 1. Suitable silicone-containing organic radicals $R^{Si}$ include the following:

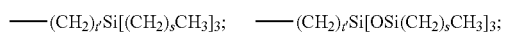

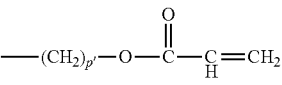

wherein $R^{18}$ denotes

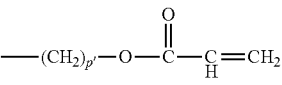

Wherein p' is 1 to 6; or an alkyl radical or a fluoro-alkyl radical having 1 to 6 carbon atoms; r' is 1 to 200, t' is 1, 2, 3 or 4; and s is 0, 1, 2, 3, 4 or 5.

The siloxane group-containing vinyl carbonate or vinyl carbamate monomers specifically include: 1,3-bis[4-(vinyloxycarbonyloxy)but-1-yl]tetramethyl-isiloxane 3-(vinyloxycarbonylthio) propyl-[tris(trimethylsiloxysilane]; 3-[tris(trimethylsiloxy)silyl] propyl allyl carbamate; 3-[tris(trimethylsiloxy)wilyl]propyl vinyl carbamate; trimethylsilylethyl vinyl carbonate; trimethylsilylmethyl vinyl carbonate, and

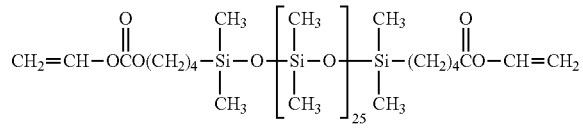

Another class of silicone-containing components includes compounds of the following formulae:

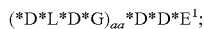

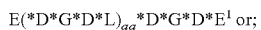

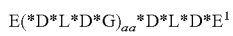

(Formulae XIII-XV)

wherein:
D denotes an alkyl diradical, an alkyl cycloalkyl diradical, a cycloalkyl diradical, an aryl diradical or an alkylaryl diradical having 6 to 30 carbon atoms,
G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;
* denotes a urethane or ureido linkage;
aa is an integer of at least 1;
L denotes a divalent polymeric radical of formula XVI:

(Formula XVI)

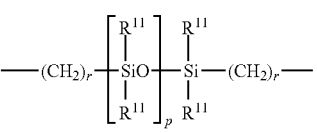

in which $R^{11}$ independently denotes an alkyl or fluoro-substituted alkyl group having 1 to 10 carbon atoms which may contain ether linkages between carbon atoms; r is at least 1; and p provides a moiety weight of 400 to 10,000; each of E and $E^1$ independently denotes a polymerizable unsaturated organic radical represented by formula XVII:

(Formula XVII)

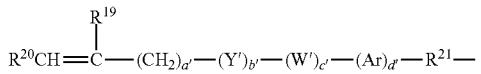

wherein $R^{19}$ is hydrogen or methyl; $R^{20}$ is hydrogen, an alkyl radical having 1 to 6 carbon atoms, or a —CO—V'—$R^{22}$ radical wherein V' is —O—, —S— or —NH— and $R^{22}$ is hydrogen or an alkyl radical having 1 to 6 carbon atoms; $R^{21}$ is a divalent radical having 1 to 12 carbon atoms; Y' denotes —CO— or —OCO—; W' denotes —O— or —NH—; Ar denotes an aromatic radical having 6 to 10 carbon atoms; a' is 0 to 6; b' is 0 or 1; c' is 0 or 1; and d' is 0 or 1.

A preferred silicone-containing component is represented by the following formula XVIII:

(Formula XVIII)

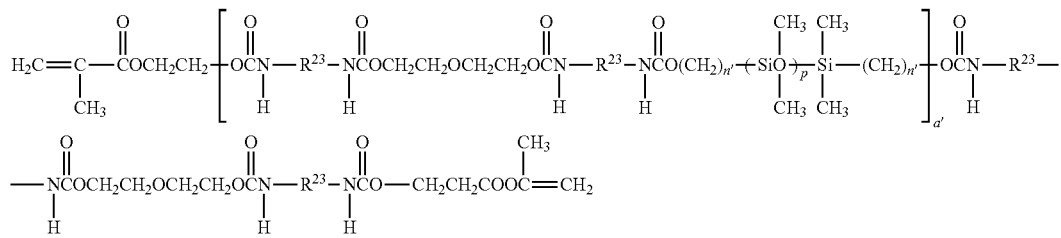

wherein $R^{23}$ is a diradical of a diisocyanate after removal of the isocyanate group, such as the diradical of isophorone diisocyanate. Another preferred silicone containing macromer is compound of formula XIX (in which x+y is a number in the range of 10 to 30) formed by the reaction of fluoroether, hydroxy-terminated polydimethylsiloxane, isophorone diisocyanate and isocyanatoethylmethacrylate.

(Formula XIX)

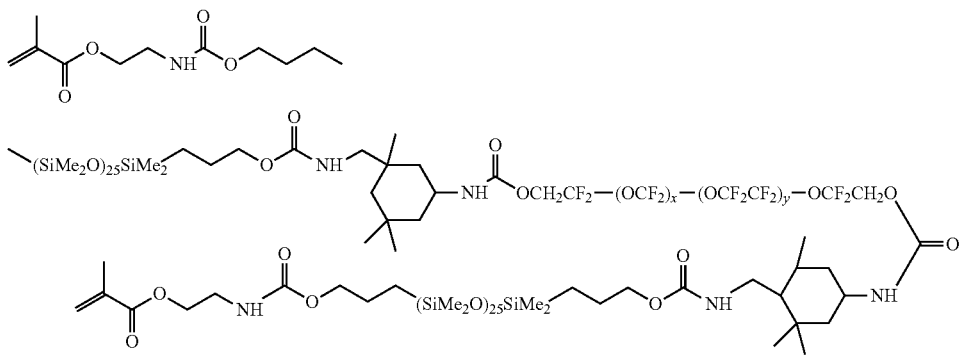

In an alternative embodiment of the present invention, the siloxane group-containing monomer may be a material of formula (A) or (B):

 (A)

 (B)

wherein
$T^1$ is a polymerisable group;
$Y^1$ and $Y^2$ are each independently a linker group selected from the group consisting of a bond, $C_{1-12}$ alkylene, $C_{2-12}$ alkenylene, $C_{2-12}$ alkynylene, $C_{3-12}$ cycloalkylene, $C_{3-12}$ cycloalkenylene, $C_{2-12}$ heteroalkenylene, $C_{2-12}$ heteroalkynylene, arylene, heteroarylene, —C(O)—$C_{1-12}$ alkylene, —C(S)—$C_{1-12}$ alkylene, —C(O)O—$C_{1-12}$ alkylene, —C(O)S—$C_{1-12}$ alkylene, —C(O)N($R^M$)—$C_{1-12}$ alkylene, —C(S)—$O_{1-12}$ alkylene, —C(S)O—$C_{1-12}$ alkylene, —C(S)S—$C_{1-12}$ alkylene, —C(S)N($R^M$)—$C_{1-12}$ alkylene, —$(CH_2)_{qq}(OCH_2CH_2)_{rr}$— and —$(CH_2CH_2O)_{rr}(CH_2)_{qq}$—, wherein $R^M$ is hydrogen or $C_{1-4}$ alkyl, qq is an integer from 1 to 10, rr is an integer from 1 to 10, wherein one or more carbon atoms in the $C_{1-12}$ alkylene group may be optionally replaced with a heteroatom selected from the group consisting of S and O and the alkylene, alkenylene, alkynylene, cycloalkylene, cycloalkenylene, heteroalkenylene, heteroalkynylene, arylene and heteroarylene groups may be optionally substituted with one or more $R^N$, wherein each $R^N$ is independently selected from the group consisting of —H, —OH, —CN, —$NO_2$, —$CF_3$, —$OCF_3$, —$CO_2H$, —$NH_2$, $C_1$-$C_{10}$ alkyl, $C_2$-$C_{10}$ alkenyl, $C_2$-$C_{10}$ alkynyl, —O($C_1$-$C_{10}$ alkyl), —O($C_2$-$C_{10}$ alkenyl), —O($C_2$-$C_{10}$ alkynyl), halogen, —C(O)H, —C(O)—($C_1$-$C_{10}$ alkyl), —C(O)—O($C_1$-$C_{10}$ alkyl), —NH($C_1$-$C_{10}$ alkyl), —N($C_1$-$C_{10}$ alkyl)$_2$, —C(O)—NH($C_1$-$C_{10}$ alkyl), —C(O)—N($C_1$-$C_{10}$ alkyl)$_2$, —NH—C(O)—($C_1$-$C_{10}$ alkyl), —NH($C_1$-$C_{10}$ alkyl)-C(O)—($C_1$-$C_{10}$ alkyl), —NH—S(O)$_2$—($C_1$-$C_{10}$ alkyl), —NH—($C_1$-$C_{10}$ alkyl)-S(O)$_2$—($C_1$-$C_{10}$ alkyl), —($C_0$-$C_{10}$)—SH, —S(O)—($C_1$-$C_{10}$ alkyl), —S(O)$_2$—($C_1$-$C_{10}$ alkyl), —S(O)$_2$—$NH_2$, —S(O)$_2$—NH—($C_1$-$C_{10}$ alkyl), —S(O)$_2$—N($C_1$-$C_{10}$ alkyl)$_2$ and =O;
$Y^3$ is a linker group;
$R^{24}$ is a $C_{1-12}$ alkyl group which may be optionally substituted with one or more $R^N$;
$G^1$ is a siloxane group-containing component;
Z is a zwitterionic group;

k is an integer from 1 to 10;
l is an integer from 1 to 3;
u is an integer from 1 to 3; and
v is an integer from 1 to 3.

In such embodiments of the present invention, the siloxane group-containing monomer includes a polymerisable group, siloxane functionality and a zwitterionic functionality within the same molecule. This is advantageous because any phase separation may be at a molecular level and so will not be visible to the naked eye. Furthermore, combining the functionalities on a molecular level makes it possible to provide materials which have a higher oxygen permeability than might be expected for a given water content.

Although formula (A) and formula (B) (and the chemical formulae which follow herein) are represented without any indication of specific stereochemistry, the skilled person will understand that a number of isomers are possible. In this regard, the present invention includes within its scope, all possible stereoisomers of the chemical structures depicted.

The polymerisable group $T^1$ is not limited and it may be any group which is capable of reaction under polymerisation conditions to form a polymer. It is the presence of the polymerisable group in the materials of the present invention which means that it is possible to form polymers and, ultimately, contact lenses from the materials of the present invention. In certain embodiments, the polymerisable group includes at least one carbon-carbon unsaturated bond. In such embodiments, the group is capable of addition polymerisation reactions. Alternatively, or in addition, the group which is capable of reaction to form a polymer is a multi-functionalised derivative which is capable of condensation polymerisation. This includes, for example, materials such as diols, diamines, diacids and derivatives thereof.

In one embodiment, the siloxane group-containing monomer is a material of formula (A). In an alternative embodiment, the siloxane group-containing monomer is a material of formula (B).

In one embodiment, the polymerisable group $T^1$ includes a group which is selected from the group consisting of acrylates, methacrylates, acrylamides, methacrylamides, styrenic and vinylic groups. Examples of suitable vinylic groups include allyl derivatives, N-vinyl lactam derivatives, such as suitably substituted N-vinyl pyrrolidone derivatives and N- and O-vinyl derivatives.

In one embodiment, the polymerisable group $T^1$ is a methacrylate or acrylate group. Preferably, the polymerisable group $T^1$ is a methacrylate group.

With reference to formula (A) and formula (B) above, k is an integer which defines the number of polymerisable groups, $T^1$, present in the polymerisable material. k may be 1, 2, 3, 4, 5, 6, 7, 8, 9 or 10. Preferably, k is 1 or 2.

$Y^1$ is a linker group which forms a link between the polymerisable group $T^1$ and the siloxane group-containing component, $G^1$, in a polymerisable material of formula (A). $Y^2$ is a linker group which forms a link between the siloxane group-containing component, $G^1$ and the zwitterionic group, Z in a polymerisable material of formula (A). $Y^1$ and $Y^2$ are each independently selected from the group consisting of a bond, $C_{1-12}$ alkylene, $C_{2-12}$ alkenylene, $C_{2-12}$ alkynylene, $C_{3-12}$ cycloalkylene, $C_{3-12}$ cycloalkenylene, $C_{2-12}$ heteroalkenylene, $C_{2-12}$ heteroalkynylene, arylene, heteroarylene, —C(O)—$C_{1-12}$ alkylene, —C(S)—$C_{1-12}$ alkylene, —C(O)O—$C_{1-12}$ alkylene, —C(O)S—$C_{1-12}$ alkylene, —C(O)N(R$^M$)—$C_{1-12}$ alkylene, —C(S)—$C_{1-12}$ alkylene, —C(S)O—$C_{1-12}$ alkylene, —C(S)S—$C_{1-12}$ alkylene, —C(S)N(R$^M$)—$C_{1-12}$ alkylene, —(CH$_2$)$_{qq}$(OCH$_2$CH$_2$)$_{rr}$— and —(CH$_2$CH$_2$O)$_{rr}$(CH$_2$)$_{qq}$—, wherein R$^M$ is hydrogen or $C_{1-4}$ alkyl, qq is an integer from 1 to 10, rr is an integer from 1 to 10, wherein one or more carbon atoms in the $C_{1-12}$ alkylene group may be optionally replaced with a heteroatom selected from the group consisting of S and O and the alkylene, alkenylene, alkynylene, cycloalkylene, cycloalkenylene, heteroalkenylene, heteroalkynylene, arylene and heteroarylene groups may be optionally substituted with one or more R$^N$, wherein each R$^N$ is independently selected from the group consisting of —H, —OH, —CN, —NO$_2$, —CF$_3$, —OCF$_3$, —CO$_2$H, —NH$_2$, $C_1$-$C_{10}$ alkyl, $C_2$-$C_{10}$ alkenyl, $C_2$-$C_{10}$ alkynyl, —O($C_1$-$C_{10}$ alkyl), —O($C_2$-$C_{10}$ alkenyl), —O($C_2$-$C_{10}$ alkynyl), halogen, —C(O)H, —C(O)—($C_1$-$C_{10}$ alkyl), —C(O)—O($C_1$-$C_{10}$ alkyl), —NH($C_1$-$C_{10}$ alkyl), —N($C_1$-$C_{10}$ alkyl)$_2$, —C(O)—NH($C_1$-$C_{10}$ alkyl), —C(O)—N($C_1$-$C_{10}$ alkyl)$_2$, —NH—C(O)—($C_1$-$C_{10}$ alkyl), —NH($C_1$-$C_{10}$ alkyl)-C(O)—($C_1$-$C_{10}$ alkyl), —NH—S(O)$_2$—($C_1$-$C_{10}$ alkyl), —NH—($C_1$-$C_{10}$ alkyl)-S(O)$_2$—($C_1$-$C_{10}$ alkyl), —($C_0$-$C_{10}$)—SH, —S(O)—($C_1$-$C_{10}$ alkyl), —S(O)$_2$—($C_1$-$C_{10}$ alkyl), —S(O)$_2$—NH$_2$, —S(O)$_2$—NH—($C_1$-$C_{10}$ alkyl), —S(O)$_2$—N($C_1$-$C_{10}$ alkyl)$_2$ and =O. $Y^1$ and $Y^2$ may be the same or different. In one embodiment, $Y^1$ and $Y^2$ are the same. In an alternative embodiment, $Y^1$ and $Y^2$ are different.

In one embodiment, $Y^1$ and $Y^2$ are each independently a $C_{1-12}$ alkylene group. In an alternative embodiment, $Y^1$ is a group of formula —(CH$_2$)$_q$(OCH$_2$CH$_2$)$_r$— and $Y^2$ is a group of formula —(CH$_2$CH$_2$O)$_{rr}$(CH$_2$)$_{qq}$—, wherein rr is an integer in the range from 1 to 10, preferably 4 to 6 and qq is an integer in the range from 1 to 10, in one embodiment, 2 to 4, preferably 3.

$Y^3$ is a linker group which forms a link between the polymerisable group, $T^1$ and the siloxane group, $G^1$, in polymerisable material of formula (B). In this embodiment of the present invention, the zwitterionic group, Z, is a substituent on the linker group, $Y^3$. The nature of $Y^3$ is not particularly limited and in a preferred embodiment, $Y^3$ is selected from the group consisting of a bond, $C_{1-12}$ alkylene, $C_{2-12}$ alkenylene, $C_{2-12}$ alkynylene, $C_{3-12}$ cycloalkylene, $C_{3-12}$ cycloalkenylene, $C_{1-12}$ heteroalkylene, $C_{2-12}$ heteroalkenylene, $C_{2-12}$ heteroalkynylene, arylene, heteroarylene, —C(O)—, —C(S)—, —C(O)O—, —C(O)S—, —C(O)N(R$^M$)—, —C(S)—, —C(S)O—, —C(S)S— and —C(S)N(R$^M$)—, wherein R$^M$ is hydrogen or $C_{1-4}$ alkyl. The alkylene, alkenylene, alkynylene, cycloalkylene, cycloalkenylene, heteroalkylene, heteroalkenylene, heteroalkynylene, arylene and heteroarylene groups may be optionally substituted with one or more R$^N$, wherein each R$^N$ is independently selected from the group consisting of —H, —OH, —CN, —NO$_2$, —CF$_3$, —OCF$_3$, —CO$_2$H, —NH$_2$, $C_1$-$C_{10}$ alkyl, $C_2$-$C_{10}$ alkenyl, $C_2$-$C_{10}$ alkynyl, —O($C_1$-$C_{10}$ alkyl), —O($C_2$-$C_{10}$ alkenyl), —O($C_2$-$C_{10}$ alkynyl), halogen, —C(O)H, —C(O)—($C_1$-$C_{10}$ alkyl), —C(O)—O($C_1$-$C_{10}$ alkyl), —NH($C_1$-$C_{10}$ alkyl), —N($C_1$-$C_{10}$ alkyl)$_2$, —C(O)—NH($C_1$-$C_{10}$ alkyl), —C(O)—N($C_1$-$C_{10}$ alkyl)$_2$, —NH—C(O)—($C_1$-$C_{10}$ alkyl), —NH($C_1$-$C_{10}$ alkyl)-C(O)—($C_1$-$C_{10}$ alkyl), —NH—S(O)$_2$—($C_1$-$C_{10}$ alkyl), —NH—($C_1$-$C_{10}$ alkyl)-S(O)$_2$—($C_1$-$C_{10}$ alkyl), —($C_0$-$C_{10}$)—SH, —S(O)—($C_1$-$C_{10}$ alkyl), —S(O)$_2$—($C_1$-$C_{10}$ alkyl), —S(O)$_2$—NH$_2$, —S(O)$_2$—NH—($C_1$-$C_{10}$ alkyl), —S(O)$_2$—N($C_1$-$C_{10}$ alkyl)$_2$ and =O. The position of the group Z as a substituent of the linker group $Y^3$ is not limited. In this regard, the group Z may be a substituent on any one of the carbon atoms which form a part of the backbone of the linker group, $Y^3$.

In one embodiment, $Y^3$ is a $C_{1-12}$ alkylene or heteroalkylene group, in particular a heteroalkylene group of formula —(CH$_2$)$_{qq}$(OCH$_2$CH$_2$)$_n$— or —(CH$_2$CH$_2$O)$_{rr}$(CH$_2$)$_{qq}$—, wherein qq is an integer from 1 to 10 and rr is an integer from 1 to 10. In a preferred embodiment, $Y^3$ is —(CH$_2$)$_3$—O—

$(CH_2)_3$—. In a preferred embodiment of the present invention, the position of substitution of the Z group on the $Y^3$ group is such that the group —$Y^3(Z)$— is —$(CH_2CH(Z)CH_2)$—O—$(CH_2)_3$—.

$G^1$ is the siloxane group-containing component of the siloxane-group containing monomer of this embodiment. As described previously, it is the inclusion of the siloxane functionality in the siloxane group-containing monomer which provides a material which has good gas permeability. The nature of the siloxane group-containing component is not particularly limited and the skilled person will be familiar with suitable components. A siloxane group is one which includes the residue having the general structure —$[Si(R)_2O]$—, wherein each R is independently selected from hydrogen or a $C_{1-12}$ alkylene, $C_{2-12}$ alkenylene, $C_{2-12}$ alkynylene, $C_{3-12}$ cycloalkylene, $C_{3-12}$ cycloalkenylene, $C_{1-12}$ heteroalkylene, $C_{2-12}$ heteroalkenylene, $C_{2-12}$ heteroalkynylene, arylene, heteroarylene group, optionally substituted with one or more $R^N$, wherein each $R^N$ is independently selected from the group consisting of —H, —OH, —CN, —$NO_2$, —$CF_3$, —$OCF_3$, —$CO_2H$, —$NH_2$, $C_1$-$C_{10}$ alkyl, $C_2$-$C_{10}$ alkenyl, alkynyl, —O($C_1$-$C_{10}$ alkyl), —O($C_2$-$C_{10}$ alkenyl), —O($C_2$-$C_{10}$ alkynyl), halogen, —C(O)H, —C(O)—($C_1$-$C_{10}$ alkyl), —C(O)—O($C_1$-$C_{10}$ alkyl), —NH($C_1$-$C_{10}$ alkyl), —N($C_1$-$C_{10}$ alkyl)$_2$, —C(O)—NH($C_1$-$C_{10}$ alkyl), —C(O)—N($C_1$-$C_{10}$ alkyl)$_2$, —NH—C(O)—($C_1$-$C_{10}$ alkyl), —NH($C_1$-$C_{10}$ alkyl)-C(O)—($C_1$-$C_{10}$ alkyl), —NH—S(O)$_2$—($C_1$-$C_{10}$ alkyl), —NH—($C_1$-$C_{10}$ alkyl)-S(O)$_2$—($C_1$-$C_{10}$ alkyl), —($C_0$-$C_{10}$)—SH, —S(O)—($C_1$-$C_{10}$ alkyl), —S(O)$_2$—($C_1$-$C_{10}$ alkyl), —S(O)$_2$—$NH_2$, —S(O)$_2$—NH—($C_1$-$C_{10}$ alkyl), —S(O)$_2$—N($C_1$-$C_{10}$ alkyl)$_2$ and =O. The R groups may be the same or different. In one embodiment all of the R groups are the same. In an alternative embodiment, the R groups are different. Preferably R is a $C_{1-12}$ alkylene group, preferably a $C_{1-6}$ alkylene group. Preferably, the Si and attached 0 are present in the siloxane group in an amount greater than 20 weight percent, and more preferably greater than 30 weight percent of the total molecular weight of the siloxane group-containing component.

In one embodiment, the siloxane group-containing component has the formula (a):

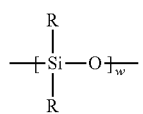

(a)

wherein R is as defined previously and w is an integer from 1 to 500.

In one embodiment, the siloxane group-containing component has the formula (b):

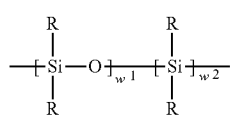

(b)

wherein R is as defined previously and $w^1$ and $w^2$ are independently an integer in the range from 1 to 500.

In one embodiment, the siloxane group-containing component has the formula (c):

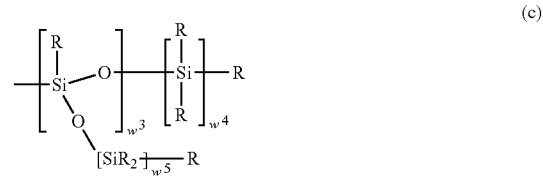

(c)

wherein R is as defined previously and $w^3$, $w^4$ and $w^5$ are each independently an integer in the range from 1 to 500.

In one embodiment, the siloxane group-containing component has the formula (d):

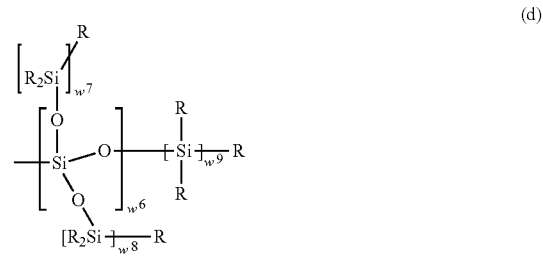

(d)

wherein R is as defined previously and $w^6$, $w^7$, $w^8$ and $w^9$ are each independently an integer in the range from 1 to 500.

Z is a zwitterionic group as defined previously. Where the siloxane group-containing monomer has formula (A), Z is bonded to $Y^2$. Where the siloxane group-containing monomer has formula (B), Z is a substituent on the linker group $Y^3$.

Preferably, Z is a group of formula (IVB), in particular, a group of formula (IVB), wherein all $R^4$ groups are methyl groups and b is 2. In this embodiment, the zwitterionic group is a phosphorylcholine (PC) group.

l is an integer which defines the number of zwitterionic groups which are present in the siloxane group-containing monomer of formula (A). l may be 1, 2 or 3. Preferably, l is 1 or 2.

u is an integer which defines the number of zwitterionic groups which are present in the siloxane group-containing monomer of formula (B). u may be 1, 2 or 3. Preferably, u is 1 or 2.

v is an integer which defines the number of $[T^1)_k$-$Y^3(Z)_u]$ groups which are present in the siloxane group-containing monomer of formula (B). u may be 1, 2 or 3. Preferably, u is 1 or 2.

Exemplary Siloxane Group-Containing Monomers of Formula (A)

In one embodiment, the siloxane group-containing monomer of the present invention has the formula (AA):

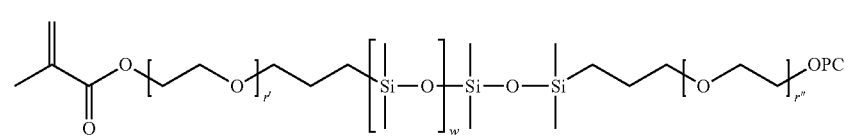

(AA)

wherein "OPC" is a zwitterionic group of formula (IVB), wherein all $R^4$ groups are methyl and b is 2, w is an integer from 1 to 500, r' and r" may be the same or different and are each independently an integer from 0 to 10, preferably 4 to 6.

Accordingly, in one embodiment, the siloxane group-containing monomer is a material of formula (A), wherein $T^1$ is a methacrylate group, $Y^1$ is $(CH_2CH_2O)_{r'}(CH_2)_3$, $G^1$ is a group of formula (c), w is an integer from 1 to 500, $Y^2$ is $(CH_2)_3(CH_2CH_2O)_{r''}$, Z is a group of formula (IVB) wherein all $R^4$ groups are methyl and b is 2, k is 1, l is 1 and r' and r" may be the same or different and are each independently an integer between 0 and 10, preferably 4 to 6.

In one embodiment of the invention, the polymerisable material is a material of formula (AB):

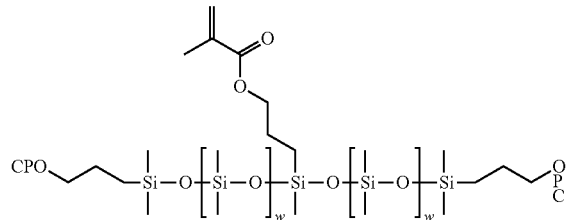

(AB)

wherein "OPC" is a zwitterionic group of formula (IVB), wherein all $R^4$ groups are methyl and b is 2 and w is 0 to 15.

Accordingly, in one embodiment, the siloxane group-containing monomer is a material of formula (A), wherein $T^1$ is a methacrylate group, $Y^1$ is $(CH_2)_3$, w is 0 to 15, preferably 2 to 4, $Y^2$ is $(CH_2)_3$, Z is a group of formula (IVB) wherein all $R^4$ groups are methyl and b is 2, k is 1 and l is 2.

Exemplary Siloxane Group-Containing Monomers of Formula (B)

In one embodiment of the present invention, the polymerisable monomer of the present invention has the formula (BB):

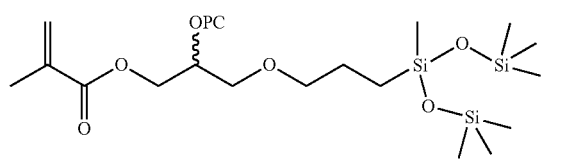

(BB)

wherein "OPC" is a zwitterionic group of formula (IVB), wherein all $R^4$ groups are methyl and b is 2.

Accordingly, in one embodiment, the siloxane group-containing monomer is a material of formula (B), wherein $T^1$ is a methacrylate group, $Y^3$ is $—(CH_2)_3—O—(CH_2)_3—$, Z is a group of formula (IVB) wherein all $R^4$ groups are methyl and b is 2, W is a group of formula (c), $R^{24}$ is methyl, u is 1 and v is 1.

In an alternative embodiment of the present invention, the siloxane group-containing monomer has the formula (BC).

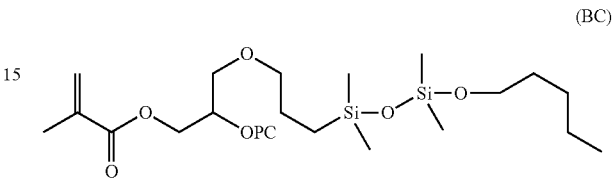

(BC)

wherein "OPC" is a zwitterionic group of formula (IVB), wherein all $R^4$ groups are methyl and b is 2.

Accordingly, in one embodiment, the siloxane group-containing monomer is a material of formula (B), wherein $T^1$ is a methacrylate group, $Y^3$ is $—(CH_2)_3—O—(CH_2)_3—$, Z is a group of formula (IVB), wherein all $R^4$ groups are methyl and b is 2, $G^1$ is a group of formula (a), $R^{24}$ is $(CH_2)_4CH_3$, u is 1 and v is 1.

In one embodiment the siloxane group-containing monomer has the formula (BD):

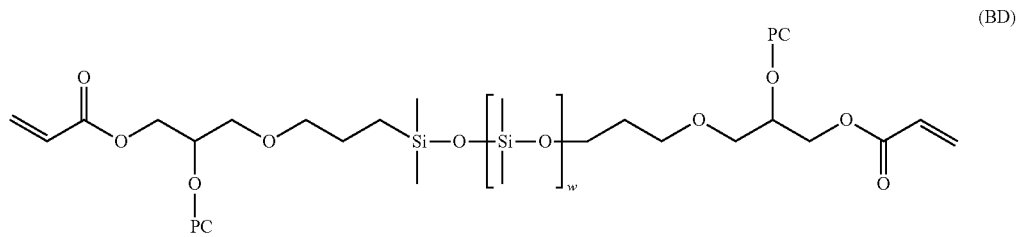

(BD)

wherein "OPC" is a zwitterionic group of formula (IVB), wherein all $R^4$ groups are methyl and b is 2 and w is an integer from 1 to 500.

Accordingly, in one embodiment, the siloxane group-containing monomer is a material of formula (B), wherein $T^1$ is an acrylate group, $Y^3$ is $—(CH_2)—(CH(OZ))—CH_2—O—(CH_2)_3—$, Z is a group of formula (IVB), wherein all $R^4$ groups are methyl and b is 2, $G^1$ is a group of formula (a), $R^{24}$ is methyl, u is 1 and v is 2.

Other silicone-containing components suitable for use in this invention include those described in WO 96/31792 such as macromers containing polysiloxane, polyalkylene ether, diisocyanate, polyfluorinated hydrocarbon, polyfluorinated ether and polysaccharide groups. U.S. Pat. No. 5,321,108, U.S. Pat. No. 5,387,662 and U.S. Pat. No. 5,539,016 all describe polysiloxanes with a polar fluorinated graft or side group having a hydrogen atom attached to a terminal difluoro-substituted carbon atom. Such polysiloxanes may also be used as the siloxane group-containing monomer in the co-solvent system.

Alternatively, the siloxane group-containing monomer may be a hydroxyl-functionalised siloxane group-containing monomer. Examples include 2-methyl-2-hydroxy-3-[3-[1,3,3,3-tetramethyl-1-[trimethylsilyl)oxy]disiloxanyl]propoxy] propyl ester (which can also be named (3-methacryloxy-2-hydroxypropyloxy)propylbis(trimethylsiloxy)methylsilane), 3-methacryloxy-2-hydroxypropyloxy)propyltris(trimethylsiloxy)silane, bis-3-methacryloxy-2-hydroxypropyloxypropyl polydimethylsiloxane, 3-methacryloxy-2-(2-hydroxyethoxy)propyloxy) propylbis(trimethylsiloxy)methylsilane, N-2-methacryloxyethyl-O-(methyl-bis-trimethylsiloxy-3-propyl)silyl carbamate and N,N,N',N'-tetrakis(3-methacryloxy-2-hydroxypropyl)-[alpha],[omega]-bis-3-aminopropyl-polydimethylsiloxane and mixtures thereof.

In one embodiment, the ethylenically unsaturated zwitterionic monomer is added to the co-monomer system in an amount in the range from about 1 to about 75 wt %, in one embodiment, about 2 to about 70 wt %, in one embodiment, about 5 to about 65 wt %, in one embodiment about 10 to about 60 wt % based on the weight of the polymerisable solution. In one embodiment, the ethylenically unsaturated zwitterionic monomer is included in an amount of about 1 wt % or more, about 2 wt % or more, about 5 wt % or more, about 7 wt % or more, about 10 wt % or more based on the weight of the polymerisable solution. In one embodiment, the ethylenically unsaturated zwitterionic monomer is included in an amount of about 75 wt % or less, about 70 wt % or less, about 60 wt % or less, about 50 wt % or less, about 40 wt % or less, about 30 wt % or less, about 20 wt % or less based on the weight of the polymerisable solution.

In one embodiment, the functionalised ethylenically unsaturated solubilising monomer may be included in the co-monomer system an amount in the range from about 20 to about 90 wt %, in one embodiment, about 25 to about 85 wt %, in one embodiment, about 30 to about 80 wt % based on the weight of the polymerisable solution. In one embodiment, the functionalised ethylenically unsaturated solubilising monomer is included in an amount of about 20 wt % or more, about 25 wt % or more, about 30 wt % or more, about 35 wt % or more of the polymerisable solution. In one embodiment, the functionalised ethylenically unsaturated solubilising monomer is included in an amount of about 90 wt % or less, about 85 wt % or less, about 80 wt % or less, about 75 wt % or less, about 70 wt % or less, about 60 wt % or less, about 50 wt % or less based on the weight of the polymerisable solution.

In one embodiment, the siloxane group-containing monomer or macromer may be included in the co-monomer system in an amount in the range from about 1 to about 50 wt %, in one embodiment, about 5 to about 45 wt %, in one embodiment, about 10 to about 40 wt %, in one embodiment, about 20 to about 30 wt % based on the weight of the polymerisable solution. In one embodiment, the siloxane group-containing monomer or macromer is included in an amount of about 1 wt % or more, about 5 wt % or more, about 10 wt % or more, about 15 wt % or more, about 20 wt % or more based on the weight of the polymerisable solution. In one embodiment, the siloxane group-containing monomer or macromer is included in an amount of about 50 wt % or less, about 45 wt % or less, about 40 wt % or less, about 35 wt % or less, about 30 wt % or less of the polymerisable solution.

In one embodiment, the ethylenically unsaturated zwitterionic monomer is included in an amount of about 1 to about 75 wt %, in one embodiment, about 2 to about 70 wt %, in one embodiment, about 5 to about 65 wt %, in one embodiment about 10 to about 60 wt % of the polymerisable solution and the siloxane group-containing monomer or macromer may be included in an amount in the range from about 1 to about 50 wt %, in one embodiment, about 5 to about 45 wt %, in one embodiment, about 10 to about 40 wt %, in one embodiment, about 20 to about 30 wt % based on the weight of the polymerisable solution.

In one embodiment, the ethylenically unsaturated zwitterionic monomer is included in an amount of about 1 to about 75 wt %, in one embodiment, about 2 to about 70 wt %, in one embodiment, about 5 to about 65 wt %, in one embodiment about 10 to about 60 wt % based on the weight of the polymerisable solution, the functionalised ethylenically unsaturated solubilising monomer may be included in an amount in the range from about 20 to about 90 wt %, in one embodiment, about 25 to about 85 wt %, in one embodiment, about 30 to about 80 wt % based on the weight of the polymerisable solution and the siloxane group-containing monomer or macromer may be included in an amount in the range from about 1 to about 50 wt %, in one embodiment, about 5 to about 45 wt %, in one embodiment, about 10 to about 40 wt %, in one embodiment, about 20 to about 30 wt % based on the weight of the polymerisable solution.

In one embodiment, the ratio of ethylenically unsaturated zwitterionic monomer to siloxane group-containing monomer or macromer in the polymerisable solution is in the range from about 0.1 to about 5, in one embodiment, about 0.15 to about 4, in one embodiment, about 0.2 to about 3. Advantageously, where the ratio of ethylenically unsaturated zwitterionic monomer to siloxane group-containing monomer or macromer in the polymerisable solution is controlled to be within this range, the polymerisable solution is clear, as are the derived polymers before and after hydration.

The cross-linking agent which forms a part of the co-monomer system in which the ethylenically unsaturated zwitterionic monomer is dissolved may be any cross-linking agent with which the skilled person will be familiar. Examples of suitable cross-linking agents include ethylene glycol dimethacrylate (EGDMA), trimethylolpropane trimethacrylate (TMPTMA), glycerol trimethacrylate, polyethyleneglycol dimethacrylate and other polycrylate and polymethacrylate esters. The cross-linking agent may be included in an amount in the range from about 0.1 to about 10 wt %, in one embodiment, about 0.2 to about 8 wt %, in one embodiment, about 0.5 to about 7 wt %, in one embodiment, about 1 to about 6 wt % based on the weight of the polymerisable solution.

The co-monomer system in which the ethylenically unsaturated zwitterionic monomer is dissolved may further comprise additional components including hydrophilic monomers, macromeres, UV absorbers, tinting agents, antibacterial agents, therapeutic agents, pigments, non-reactive diluents and combinations thereof.

The term "hydrophilic" as used to describe the monomers which may form a part of the co-monomer system is intended to have its normal meaning, specifically it is used to describe monomers which have an affinity for water. Hydrophilic monomers are monomers which contain a polymerisable double bond and at least one hydrophilic group. Examples of hydrophilic groups include acrylic, methacrylic, acrylamido, methacrylamido, fumaric, maleic, styryl, isopropenyl, O-vinylcarbonate, O-vinylcarbamate, allylic, O-vinyl acetyl, N-vinyllactam and N-vinylamido double bonds. In one embodiment, the co-solvent system further comprises a hydrophilic monomer selected from the group consisting of N-vinyl pyrrolidone, methacrylic acid, glycerol monomethacrylate, dimethylacrylamide, hydroxypropyl (meth)acrylate and isomers, and 2-hydroxyethyl(meth)acrylate (HEMA). Where present, hydrophilic monomers may be included in an amount in the range from about 0.1 to about 75 wt %, in one embodiment, about 1 to about 70 wt %, in one embodiment, about 5 to about 60 wt %, in one embodiment, about 10 to about 15 wt % based on the weight of the polymerisable solution.

Where present, a non-reactive diluent is generally included in the homogeneous polymerisable solution in small amounts, typically of the order of about 1 to about 25 wt %, preferably about 2 to about 10 wt % based on the weight of the polymerisable solution. The skilled person will be familiar with suitable non-reactive diluents. In principle, suitable diluents are all solvents which dissolve the other monomers present in the polymerisable solution, for example, water, alcohols, e.g. methanol, ethanol and glycol, carboxylic acid amides such as dimethylformamide, dipolar aprotic solvents, such as dimethyl sulfoxide or methyl ethyl ketone, ketones, such as acetone or cyclohexanone, hydrocarbons such as toluene, ethers such as THF, dimethoxyethane or dioxane and halogenated hydrocarbons such as trichloroethane and combinations thereof.

The solution which results from dissolving the ethylenically unsaturated zwitterionic monomer in the co-solvent system is a homogeneous polymerisable solution. Hence, in a second aspect, the present invention provides a polymerisable solution comprising an an ethylenically unsaturated zwitterionic monomer, a functionalised ethylenically unsaturated solubilising monomer in which the zwitterionic monomer is soluble, a siloxane group-containing monomer or macromer and a crosslinking agent. The polymerisable solution may further comprise one or more components selected from the group consisting of hydrophilic monomers, macromers, UV absorbers, tinting agents, antibacterial agents, therapeutic agents, pigments, diluents and combinations thereof. Thus, in one embodiment, the polymerisable solution consists essentially of or consists of an ethylenically unsaturated zwitterionic monomer, a functionalised ethylenically unsaturated solubilising monomer in which the zwitterionic monomer is soluble, a siloxane group-containing monomer or macromer, a crosslinking agent, and optionally one or more components selected from the group consisting of hydrophilic monomers, macromers, UV absorbers, tinting agents, antibacterial agents, therapeutic agents, pigments, diluents and combinations thereof. Advantageously, the polymerisable solution of the present invention is homogeneous and clear. This means that the polymerisable solution can then be polymerised to form a polymer which is clear, with the zwitterionic component contributing towards a high water content, improved wettability, a lower modulus and a reduced propensity for surface deposits to form thereon than an analagous formulation without the zwitterionic component.

The term "clear" is used herein to refer to polymerisable solutions which appear transparent and non-opaque to the visible eye. In one embodiment, these solutions have an optical transmission of about 80% or more, about 85% or more, about 90% or more, about 95% or more, about 99% or more.

The method of the present invention may comprise a further step of polymerising the homogeneous polymerisable solution to produce a polymer.

The polymerisation step may be a conventional polymerization reaction, for example by thermal or photochemical polymerization. For thermal polymerisation, a temperature in the range from 40 to 100° C., typically 50 to 80° C. may be used. For a photochemical polymerisation, actinic radiation such as gamma, UV, visible or microwave radiation may be use. Typically UV radiation of wavelength 200 to 400 nm is used.

In one embodiment, polymerisation may be performed in the presence of a solvent with which the groups present in the monomers will not react under the polymerisation conditions used, for example water, alcohols, such as ethanol, methanol and glycol, and furthermore carboxylic acid amides, such as dimethylformamide, dipolar aprotic solvents, such as dimethyl sulfoxide or methyl ethyl ketone, ketones for example acetone or cyclohexanone, hydrocarbons, for example toluene, ethers, for example THF, dimethoxyethane or dioxane and halogenated hydrocarbons, for example trichloroethane and also mixtures of suitable solvents, for example mixtures of water with an alcohol, for example a water/ethanol or water/methanol mix. Any mixtures of these solvents may be used. While an advantage of the method of the present invention is that it is not necessary to use such additional solvents, their inclusion may be desirable in some cases. For example, the addition of a small amount (e.g. 2 to 10 wt %) of a non-reactive solvent may aid with mold release where polymerisation is performed directly in a mold, may aid with extraction of unwanted components and/or reduce changes in lens dimensions when the molded lenses are hydrated.

The polymerisation may be carried out in the presence of one or more polymerisation initiators, such as benzoyl peroxide, 2,2'-azo-bis(2-methylpropionitrile) or benzoin methyl ether. Other polymerisation initiators which may be used are disclosed in "Polymer Handbook", 3rd Edition, Ed. J. Brandrup and E. H. Immergut, Pub. Wiley-Interscience, New York 1989.

Generally, the duration of the polymerisation step will depend on the technique which is used to form the end article. For example, where the polymer is to be used to form an ophthalmic lens, the lens may be formed by cast molding or by forming a larger bulk material which is then cut down into lenses. In the former case, the polymerisation time may be in the range from 1 second to 1 hour. In the latter case, polymerisation times may range from 0.1 to 72 hours, in one embodiment, 0.1 to 1 hours, in an alternative embodiment, 8 to 48 hours, for instance 16 to 24 hours and under an inert atmosphere of, for example, nitrogen or argon.

The polymers which can be obtained by the method of the present invention i.e. by polymerising a polymerisable solution comprising an ethylenically unsaturated zwitterionic monomer, a functionalised ethylenically unsaturated solubilising monomer in which the zwitterionic monomer is soluble, a siloxane group-containing monomer or macromer and a crosslinking agent, are cross-linked polymers which are particularly useful in ophthalmic applications. In this regard, the present invention further provides a polymer obtainable by the methods described herein.

In one embodiment, the present invention provides a xerogel comprising a polymer obtained by the method of the present invention and which is essentially free from water.

After a polymer (or xerogel) has been synthesized, the method of the present invention may comprise a further step of hydrating the polymer to form a silicone hydrogel. The polymer formed may be hydrated by standard techniques with which the person skilled in the art will be familiar. For example, the polymer may be hydrated by soaking in phosphate-buffered saline. Thus, the present invention further provides a silicone hydrogel comprising a polymer obtained by the method of the present invention and water in an amount of 30 to 80% by weight of the hydrogel.

The polymers of the present invention have a balance of properties, such as clarity, gas permeability and water content which makes them particularly useful.

In one embodiment, the polymer of the present invention has an equilibrium water content of 10% or more, 15% or more, 20% or more, 25% or more, 30% or more, 35% or more, 40% or more, 45% or more, 50% or more, 55% or more, 60% or more, 65% or more, 70% or more, 75% or more, 80% or more, 85% or more, 90% or more, 95% or more. In one embodiment, the water content of the polymer is in the range from about 20 to about 60%, preferably about 30 to about 50%.

Alternatively or in addition, the polymers of the present invention may have a tensile modulus (modulus of elasticity, E) of less than about 3 MPa. In one embodiment, the tensile modulus is in the range from 0.2 to about 2.5 MPa, in one instance about 0.3 to 1.5 MPa, preferably about 0.4 to about 1 MPa.

Alternatively or in addition, the polymers of the present invention may have an optical transmission of about 80% or more, about 85% or more, about 90% or more, about 95% or more, about 99% or more. In a preferred embodiment, the polymers of the present invention are transparent and/or clear which is particularly advantageous where they are used to form an ocular device.

The properties of the polymers of the present invention mean that they are particularly suitable for use in ophthalmic applications. Therefore, in a further aspect, the present invention provides an article, in particular an ocular device, comprising a polymer as defined herein. Preferably, the ocular device is an ophthalmic lens, preferably a contact lens.

An ophthalmic lens is a lens which, in use, will be placed in intimate contact with the eye or tear fluid. The term "ophthalmic lens" is intended to include contacts lenses for vision correction, contact lenses for changing eye colour, ophthalmic drug delivery devices and ocular tissue protective devices.

The ophthalmic lenses of the present invention may be manufactured by transferring the polymerisable solution into a lens mold cavity and initiating polymerization. Initiators, including photoinitiators, which are commercially available may be added to the mixture to aid initiation of the polymerization. As described previously, polymerization may be initiated by a number of well known techniques depending on the exact nature of the mixture. Examples of suitable techniques include application of radiation such as microwave, e-beam or ultraviolet. Alternatively, polymerization may be initiated thermally. Where the ophthalmic lenses are manufactured in this way, it may be advantageous to include a diluent in the homogeneous polymerisable solution as it aids with extraction from the mold. It also helps to ensure that the molded polymer retains the same shape and dimensions when it is hydrated to form a silicone hydrogel.

Alternatively, the ophthalmic lenses of the present invention may be prepared by polymerising the homogeneous polymerisable mixture to form a product which can then be formed into the appropriate shape by cutting and lathing.

In contrast to other tissues which receive oxygen from blood flow, the cornea receives oxygen primarily from the corneal surface which is exposed to the environment. Therefore, an ophthalmic lens which is intended to be worn on the eye for extended periods of time must allow sufficient oxygen to permeate through the lens in order to sustain corneal health. It is possible to detect when the cornea has received an inadequate supply of oxygen because it will swell. Preferably, the oxygen permeability of the ophthalmic lenses of the present invention is sufficient to prevent any clinically significant swelling of the cornea from occurring. In one embodiment, the extent of corneal swelling observed is about 10% or less over at least 8 hours, about 8% or less over at least 8 hours, about 6% or less over at least 8 hours, about 4% or less over at least 8 hours, about 2% or less over at least 8 hours, about 1% or less over at least 8 hours.

In this regard, preferably an ophthalmic lens of the present invention is suitable for extended wear. Advantageously, the ophthalmic lenses of the present invention may be worn by a user for up to 4 days or more, in one embodiment 7 days or more, in one embodiment 14 days or more, in one embodiment 30 days or more, without causing substantial corneal damage or user discomfort.

Accordingly, in one embodiment, the article of the present invention has an oxygen permeability of about 30 barriers or more, preferably about 40 barriers or more, preferably about 50 barriers or more, preferably about 60 barriers or more.

Alternatively or in addition, the article of the present invention has an equilibrium water content of 10% or more, 15% or more, 20% or more, 25% or more, 30% or more, 35% or more, 40% or more, 45% or more, 50% or more, 55% or more, 60% or more, 65% or more, 70% or more, 75% or more, 80% or more, 85% or more, 90% or more, 95% or more. In one embodiment, the water content of the polymer is in the range from about 20 to about 60%, preferably about 30 to about 50%.

Alternatively or in addition, the articles of the present invention may have a tensile modulus (modulus of elasticity, E) of less than about 3 MPa. In one embodiment, the tensile modulus is in the range from 0.2 to about 2.5 MPa, in one instance about 0.3 to 1.5 MPa, preferably about 0.4 to about 1 MPa.

Alternatively or in addition, the articles of the present invention may have an optical transmission of about 80% or more, about 85% or more, about 90% or more, about 95% or more, about 99% or more. In a preferred embodiment, the articles of the present invention are transparent and/or clear which is particularly advantageous where the article is an ocular device.

Alternatively or in addition, the articles of the present invention may have a % of scattered visible light (haze) of <100%, in one embodiment, <80%, in one embodiment, <60%, in one embodiment <50%, measured according to the standard ASTM D 1003.

Several illustrative embodiments of the invention are described by the following enumerated clauses:

1. A method comprising dissolving an ethylenically unsaturated zwitterionic monomer in a co-monomer system comprising a functionalised ethylenically unsaturated monomer in which the zwitterionic monomer is soluble, a siloxane group-containing monomer or macromer, and a crosslinking agent, to produce a polymerisable solution.

2. A method according to clause 1, wherein the ethylenically unsaturated zwitterionic monomer is a monomer of formula (I):

(I)

wherein:
J is selected from the group consisting of
   a valence bond;
   —W—X—Y—, wherein W is $(CR^1{}_2)_n$; X is O, S or $NR^2$ and Y is a linker group; and
   —K—X—Y—, wherein K is $(CR^1{}_2)_n C(O)$ and X and Y are as defined above;
Z is a zwitterionic group;
each $R^1$ is independently selected from H, halogen or $C_{1-4}$ alkyl;
$R^2$ is H or $C_{1-4}$ alkyl;

n is an integer from 0 to 6; and
m is an integer from 0 to 6.

3. A method according to clause 2, wherein the ethylenically unsaturated zwitterionic monomer is a monomer of formula (ID):

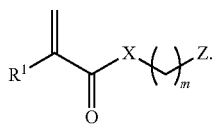

(ID)

4. A method according to clause 3, wherein $R^1$ is methyl, X is O and m is 2.

5. A method according to clause 1, wherein the ethylenically unsaturated zwitterionic monomer is a monomer of formula (III):

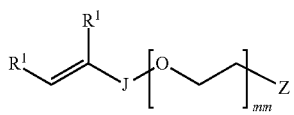

(III)

wherein J is selected from the group consisting of
a valence bond;
—W—X—Y—, wherein W is $(CR^1{}_2)_n$; X is O, S or $NR^2$ and Y is a linker group; and
—K—X—Y—, wherein K is $(CR^1{}_2)_nC(O)$ and X and Y are as defined above;
Z is a zwitterionic group;
each $R^1$ is independently selected from H, halogen or $C_{1-4}$ alkyl;
$R^2$ is H or $C_{1-4}$ alkyl;
n is an integer from 0 to 6; and
mm is an integer from 1 to 20.

6. A method according to any one of clauses 2 to 5, wherein Z is a group of formula (IVB):

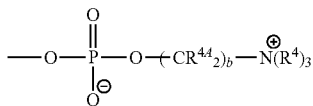

(IVB)

wherein each $R^4$ and $R^{4A}$ is independently selected from hydrogen and $C_{1-4}$ alkyl and b is an integer from 1 to 4;

7. A method according to any preceding clause, wherein the ethylenically unsaturated zwitterionic monomer is 2-methacryloyloxyethyl-2'-(trimethylammoniumethyl)phosphate inner salt (MPC).

8. A method according to any preceding clause, wherein the functionalised ethylenically unsaturated monomer in which the zwitterionic monomer is soluble is HEMA or GMA.

9. A method according to clause 8, wherein the functionalised ethylenically unsaturated monomer in which the zwitterionic monomer is soluble is HEMA.

10. A method according to any preceding clause, wherein the siloxane group-containing monomer is a material of formula (A) or (B):

$(T^1\text{-}Y^1)_k\text{-}G^1(Y^2\text{—}Z)_l$ (A)

$[(T^1)_k\text{-}Y^3(Z)_u]_v\text{-}G^1\text{-}R^{24}$ (B)

wherein
$T^1$ is a polymerisable group;
$Y^1$ and $Y^2$ are each independently a linker group selected from the group consisting of a bond, $C_{1-12}$ alkylene, $C_{2-12}$ alkenylene, $C_{2-12}$ alkynylene, $C_{3-12}$ cycloalkylene, $C_{3-12}$ cycloalkenylene, $C_{2-12}$ heteroalkenylene, $C_{2-12}$ heteroalkynylene, arylene, heteroarylene, —C(O)—$C_{1-12}$ alkylene, —C(S)—$C_{1-12}$ alkylene, —C(O)O—$C_{1-12}$ alkylene, —C(O)S—$C_{1-12}$ alkylene, —C(O)N($R^M$)—$C_{1-12}$ alkylene, —C(S)—$C_{1-12}$ alkylene, —C(S)O—$C_{1-12}$ alkylene, —C(S)S—$C_{1-12}$ alkylene, —C(S)N($R^M$)—$C_{1-12}$ alkylene, —$(CH_2)_{qq}(OCH_2CH_2)_{rr}$— and —$(CH_2CH_2O)_{rr}(CH_2)_{qq}$—, wherein $R^M$ is hydrogen or $C_{1-4}$ alkyl, qq is an integer from 1 to 10, rr is an integer from 1 to 10, wherein one or more carbon atoms in the $C_{1-12}$ alkylene group may be optionally replaced with a heteroatom selected from the group consisting of S and O and the alkylene, alkenylene, alkynylene, cycloalkylene, cycloalkenylene, heteroalkenylene, heteroalkynylene, arylene and heteroarylene groups may be optionally substituted with one or more $R^N$, wherein each $R^N$ is independently selected from the group consisting of —H, —OH, —CN, —$NO_2$, —$CF_3$, —$OCF_3$, —$CO_2H$, —$NH_2$, $C_1$-$C_{10}$ alkyl, $C_2$-$C_{10}$ alkenyl, $C_2$-$C_{10}$ alkynyl, —O($C_1$-$C_{10}$ alkyl), —O($C_2$-$C_{10}$ alkenyl), —O($C_2$-$C_{10}$ alkynyl), halogen, —C(O)H, —C(O)—($C_1$-$C_{10}$ alkyl), —C(O)—O($C_1$-$C_{10}$ alkyl), —NH($C_1$-$C_{10}$ alkyl), —N($C_1$-$C_{10}$ alkyl)$_2$, —C(O)—NH($C_1$-$C_{10}$ alkyl), —C(O)—N($C_1$-$C_{10}$ alkyl)$_2$, —NH—C(O)—($C_1$-$C_{10}$ alkyl), —NH($C_1$-$C_{10}$ alkyl)-C(O)—($C_1$-$C_{10}$ alkyl), —NH—S(O)$_2$—($C_1$-$C_{10}$ alkyl), —NH—($C_1$-$C_{10}$ alkyl)-S(O)$_2$—($C_1$-$C_{10}$ alkyl), —($C_0$-$C_{10}$)—SH, —S(O)—($C_1$-$C_{10}$ alkyl), —S(O)$_2$—($C_1$-$C_{10}$ alkyl), —S(O)$_2$—$NH_2$, —S(O)$_2$—NH—($C_1$-$C_{10}$ alkyl), —S(O)$_2$—N($C_1$-$C_{10}$ alkyl)$_2$ and =O;
$Y^3$ is a linker group;
$R^{24}$ is a $C_{1-12}$ alkyl group which may be optionally substituted with one or more $R^N$;
$G^1$ is a siloxane group-containing component;
Z is a zwitterionic group;
k is an integer from 1 to 10;
l is an integer from 1 to 3;
u is an integer from 1 to 3; and
v is an integer from 1 to 3.

11. A method according to any preceding clause, wherein the co-monomer system further comprises one or more components selected from the group consisting of hydrophilic monomers, macromers, UV absorbers, tinting agents, anti-bacterial agents, therapeutic agents, pigments, diluents and combinations thereof.

12. A method according to clause 11, wherein the co-monomer system further comprises a hydrophilic monomer.

13. A method according to clause 12, wherein the hydrophilic monomer is selected from the group consisting of dimethylacrylamide, 2-hydroxyethylmethacrylate and N-vinylpyrollidone.

14. A method according to any preceding clause, wherein the ethylenically unsaturated zwitterionic monomer is included in an amount such that the ratio of ethylenically unsaturated zwitterionic monomer to siloxane group-containing monomer or macromer in the polymerisable solution is about 0.1 to about 5.

15. A method according to any preceding clause, wherein the ethylenically unsaturated zwitterionic monomer is pre-dissolved in the functionalised ethylenically unsaturated monomer in which it is soluble prior to mixing with the siloxane group-containing monomer or macromer and the crosslinking agent. 16. A method according to any preceding clause, wherein the polymerisable solution is homogeneous and wherein the method comprises a further step of polymerising the homogeneous polymerisable solution.
17. A method according to any preceding clause, wherein the co-monomer system further comprises a non-reactive diluent.
18. A method according to clause 17, wherein the non-reactive diluent is water or an alcohol.
19. A method according to clause 17 or clause 18, wherein the polymerisable solution is homogeneous and wherein the method comprises a further step of removing the non-reactive diluent after the homogeneous polymerisable mixture has been polymerised.
20. A method according to any one of clauses 16 to 19 comprising a further step of hydrating the polymer obtained after polymerisation.
21. A polymerisable solution comprising an ethylenically unsaturated zwitterionic monomer, a functionalised ethylenically unsaturated monomer in which the zwitterionic monomer is soluble, a siloxane group-containing monomer or macromer and a crosslinking agent.
22. A method for producing a polymer comprising polymerising a polymerisable solution as defined in clause 21.
23. A polymer obtainable by the method of any one of clauses 16 to 20.
24. A polymer obtainable by polymerising a polymerisable solution comprising an ethylenically unsaturated zwitterionic monomer, a functionalised ethylenically unsaturated monomer in which the zwitterionic monomer is soluble, a siloxane group-containing monomer or macromer and a crosslinking agent.
25. A xerogel comprising a polymer as defined in clause 23 or clause 24, which is free from water.
26. A silicone hydrogel comprising a polymer as defined in clause 23 or clause 24, and water in an amount of 30 to 80% by weight of hydrogel.
27. A polymer according to clause 23 or clause 24, which has an equilibrium water content in the range from 30 to 50%.
28. A polymer according to any one of clauses 20 to 23, which has a modulus in the range from 0.5 to 1.0 MPa.
29. An article comprising a polymer as defined in any one of clauses 23 to 28.
30. An article according to clause 29, which is a contact lens.
31. A contact lens according to clause 30, which has an oxygen permeability of about 30 barriers or more.
32. A contact lens according to clause 30 or clause 31, which has an equilibrium water content in the range from 30 to 50%.

Chemical Groups

Halo

The term "halogen" (or "halo") is used herein to refer to fluorine, chlorine, bromine and iodine.

Carbonyl and Carboxy

The term "carbonyl" is used herein to refer to a carbon connected with a double bond to an oxygen atom, and tautomeric forms thereof. A carbonyl group may also be denoted as —C(O)—. Examples of moieties that contain a carbonyl include but are not limited to aldehydes —C(O)H, ketones —C(O)—($C_1$-$C_{10}$ alkyl)-, carboxylic acids —$CO_2H$ and amides —C(O)$NH_2$, —C(O)—NH($C_1$-$C_{10}$ alkyl), —C(O)—N($C_1$-$C_{10}$ alkyl)$_2$, —NH—C(O)—($C_1$-$C_{10}$ alkyl), —NH($C_1$-$C_{10}$ alkyl)-C(O)—($C_1$-$C_{10}$ alkyl) and esters —C(O)—O($C_1$-$C_{10}$ alkyl).

Thiocarbonyl and Thiocarboxy

The terms "thiocarbonyl" and "thiocarboxy" are used herein to refer to a carbon connected via a double bond to a sulfur atom, and tautomeric forms thereof.

Alkyl, Alkenyl, Cycloalkyl Etc.

The term "alkyl" is used herein to refer to monovalent straight chain or branched, saturated, acyclic hydrocarbyl groups. In one embodiment, alkyl is $C_{1-10}$alkyl, in another embodiment $C_{1-6}$alkyl, in another embodiment $C_{1-4}$alkyl, such as methyl, ethyl, n-propyl, i-propyl or i-, n-, secondary or t-butyl groups.

The term "cycloalkyl" is used herein to refer to monovalent, saturated, cyclic hydrocarbyl groups. In one embodiment, cycloalkyl is $C_{3-10}$cycloalkyl, in another embodiment, $C_{3-6}$cycloalkyl, such as cyclopentyl and cyclohexyl.

The term "alkenyl" is used herein to refer to monovalent straight or branched, unsaturated, acyclic hydrocarbyl groups having at least one carbon-carbon double bond and, in one embodiment, no carbon-carbon triple bonds. In one embodiment alkenyl is $C_{2-10}$alkenyl, in another embodiment, $C_{2-6}$alkenyl, in another embodiment $C_{2-4}$alkenyl.

The term "cycloalkenyl" is used herein to refer to monovalent, unsaturated, cyclic hydrocarbyl groups. In one embodiment, cycloalkenyl is $C_{3-10}$cycloalkyl, in another embodiment, $C_{3-6}$cycloalkyl, such as cyclopentenyl and cyclohexenyl.

The term "alkynyl" is used herein to refer to monovalent straight or branched, unsaturated, acyclic hydrocarbyl groups having at least one carbon-carbon triple bond. In one embodiment alkynyl is $C_{2-10}$alkynyl, in another embodiment, $C_{2-6}$alkynyl, in another embodiment $C_{2-4}$alkynyl.

Heteroalkyl, Heterocyclyl Etc.

The term "heteroalkyl" is used herein to refer to monovalent alkyl groups in which up to three carbon atoms, in one embodiment up to two carbon atoms, in another embodiment one carbon atom, are each replaced independently by O, $S(O)_q$ or N, provided at least one of the alkyl carbon atoms remains. The heteroalkyl group may be C-linked or hetero-linked, i.e. it may be linked to the remainder of the molecule through a carbon atom or through O, $S(O)_q$ or N, wherein q is independently 0, 1 or 2.

The term "heterocyclyl" or "heterocyclic ring" is used herein to refer to monovalent, cycloalkyl groups or divalent cycloalkylene groups in which up to three carbon atoms, in one embodiment up to two carbon atoms, in another embodiment one carbon atom, are each replaced independently by O, $S(O)_q$ or N, provided at least one of the cycloalkyl carbon atoms remains.

Examples of heterocyclyl groups include oxiranyl, thiaranyl, aziridinyl, oxetanyl, thiatanyl, azetidinyl, tetrahydrofuranyl, tetrahydrothiophenyl, pyrrolidinyl, pyrazolidinyl, imidazolidinyl, tetrahydropyranyl, tetrahydrothiopyranyl, piperidinyl, 1,4-dioxanyl, 1,4-oxathianyl, morpholinyl, 1,4-dithianyl, piperazinyl, 1,4-azathianyl, oxepanyl, thiepanyl, azepanyl, 1,4-dioxepanyl, 1,4-oxathiepanyl, 1,4-oxaazepanyl, 1,4-dithiepanyl, 1,4-thieazepanyl and 1,4-diazepanyl. Other examples include cyclic imides, cyclic anhydrides and thiazolidinediones. The heterocyclyl group may be C-linked or N-linked, i.e. it may be linked to the remainder of the molecule through a carbon atom or through a nitrogen atom.

Aryl Etc.

The term "aryl" is used herein to refer to monovalent, aromatic, cyclic hydrocarbyl groups, such as phenyl or naphthyl (e.g. 1-naphthyl or 2-naphthyl). In general, the aryl group may be a monocyclic or polycyclic fused ring aromatic group. Preferred aryl groups are $C_6$-$C_{14}$aryl.

Other examples of aryl groups are monovalent radicals derived from aceanthrylene, acenaphthylene, acephenanthrylene, anthracene, azulene, chrysene, coronene, fluoranthene, fluorene, as-indacene, s-indacene, indene, naphthalene, ovalene, perylene, phenalene, phenanthrene, picene, pleiadene, pyrene, pyranthrene and rubicene.

Heteroaryl Etc.

The term "heteroaryl" is used herein to refer to monovalent, heteroaromatic, cyclic hydrocarbyl groups additionally containing one or more heteroatoms independently selected from O, S, N and $NR^N$, wherein $R^N$ is preferably H, alkyl (e.g. $C_{1-6}$alkyl) or cycloalkyl (e.g. $C_{3-6}$cycloalkyl).

In general, the heteroaryl group may be a monocyclic or polycyclic (e.g. bicyclic) fused ring heteroaromatic group. In one embodiment, heteroaryl groups contain 5-13 ring members (preferably 5-10 members) and 1, 2, 3 or 4 ring heteroatoms independently selected from O, S, N and $NR^N$. In one embodiment, a heteroaryl group may be 5, 6, 9 or 10 membered, e.g. 5-membered monocyclic, 6-membered monocyclic, 9-membered fused-ring bicyclic or 10-membered fused-ring bicyclic.

Monocyclic heteroaromatic groups include heteroaromatic groups containing 5-6 ring members and 1, 2, 3 or 4 heteroatoms selected from O, S, N or $NR^N$.

In one embodiment, 5-membered monocyclic heteroaryl groups contain 1 ring member which is an —$NR^N$— group, an —O— atom or an —S— atom and, optionally, 1-3 ring members (e.g. 1 or 2 ring members) which are =N— atoms (where the remainder of the 5 ring members are carbon atoms).

Examples of 5-membered monocyclic heteroaryl groups are pyrrolyl, furanyl, thiophenyl, pyrazolyl, imidazolyl, isoxazolyl, oxazolyl, isothiazolyl, thiazolyl, 1,2,3 triazolyl, 1,2,4 triazolyl, 1,2,3 oxadiazolyl, 1,2,4 oxadiazolyl, 1,2,5 oxadiazolyl, 1,3,4 oxadiazolyl, 1,3,4 thiadiazolyl and tetrazolyl.

Examples of 6-membered monocyclic heteroaryl groups are pyridinyl, pyridazinyl, pyrimidinyl, pyrazinyl, 1,3,5 triazinyl, 1,2,4 triazinyl and 1,2,3 triazinyl.

In one embodiment, 6-membered monocyclic heteroaryl groups contain 1 or 2 ring members which are =N— atoms (where the remainder of the 6 ring members are carbon atoms).

Bicyclic heteroaromatic groups include fused-ring heteroaromatic groups containing 9-13 ring members and 1, 2, 3, 4 or more heteroatoms selected from O, S, N or $NR^N$.

In one embodiment, 9-membered bicyclic heteroaryl groups contain 1 ring member which is an —$NR^N$— group, an —O— atom or an —S— atom and, optionally, 1-3 ring members (e.g. 1 or 2 ring members) which are =N— atoms (where the remainder of the 9 ring members are carbon atoms).

Examples of 9-membered fused-ring bicyclic heteroaryl groups are benzofuranyl, benzothiophenyl, indolyl, benzimidazolyl, indazolyl, benzotriazolyl, pyrrolo[2,3-b]pyridinyl, pyrrolo[2,3-c]pyridinyl, pyrrolo[3,2-c]pyridinyl, pyrrolo[3,2-b]pyridinyl, imidazo[4,5-b]pyridinyl, imidazo[4,5-c]pyridinyl, pyrazolo[4,3-d]pyridinyl, pyrazolo[4,3-c]pyridinyl, pyrazolo[3,4-c]pyridinyl, pyrazolo[3,4-b]pyridinyl, isoindolyl, indazolyl, purinyl, indolininyl, imidazo[1,2-a]pyridinyl, imidazo[1,5-a]pyridinyl, pyrazolo[1,2-a]pyridinyl, pyrrolo[1,2-b]pyridazinyl and imidazo[1,2-c]pyrimidinyl.

In one embodiment, 10-membered bicyclic heteroaryl groups contain 1-3 ring members which are =N— atoms (where the remainder of the 10 ring members are carbon atoms).

Examples of 10-membered fused-ring bicyclic heteroaryl groups are quinolinyl, isoquinolinyl, cinnolinyl, quinazolinyl, quinoxalinyl, phthalazinyl, 1,6-naphthyridinyl, 1,7-naphthyridinyl, 1,8-naphthyridinyl, 1,5-naphthyridinyl, 2,6-naphthyridinyl, 2,7-naphthyridinyl, pyrido[3,2-d]pyrimidinyl, pyrido[4,3-d]pyrimidinyl, pyrido[3,4-d]pyrimidinyl, pyrido[2,3-d]pyrimidinyl, pyrido[2,3-b]pyrazinyl, pyrido[3,4-b]pyrazinyl, pyrimido[5,4-d]pyrimidinyl, pyrazino[2,3-b]pyrazinyl and pyrimido[4,5-d]pyrimidinyl.

In some embodiments, a heterocyclyl group may be fused to an aryl or heteroaryl group to form a bicyclic ring system containing 5 to 13 members. Examples of such groups include dihydroisoindolyl, dihydroindolyl, tetrahydroisoquinolinyl, tetrahydroquinolinyl or 2,3-dihydro-pyrrolyl-[2,3-b]pyridine.

Alkoxy

The terms "alkoxy" and "alkyloxy" are used herein to refer to an —O-alkyl group in which alkyl is as described above. Exemplary alkoxy groups include methoxy (—$OCH_3$) and ethoxy (—$OC_2H_5$).

Alkylene

The term "alkylene" is used herein to refer to a divalent-alkyl- group in which alkyl is as defined previously. Exemplary alkylene groups include —$CH_2$—, —$(CH_2)_2$— and —$C(CH_3)HCH_2$—.

Alkenylene

The term "alkenylene" is used herein to refer to a divalent-alkenyl- group in which alkenyl is as defined previously. Exemplary alkenylene groups include —CH=CH—, —CH=CHCH$_2$—, and —CH$_2$CH=CH—.

Alkynylene

The term "alkynylene" is used herein to refer to a divalent-alkynyl- group in which -alkynyl- refers to a straight or branched chain hydrocarbon group having from 2 to 12, conveniently 2 to 6, carbon atoms and one carbon-carbon triple bond in the chain. Exemplary alkynylene groups include ethynyl and propargyl.

Arylene

The term "arylene" is used herein to refer to a divalent-aryl-group where aryl is as described above which is linked to two or more other groups. Examples of arylene groups include phenylene.

"Phenylene" means a -phenyl- group. Exemplary groups are 1,3-phenylene and 1,4-phenylene.

Heteroarylene

The term "heteroarylene" is used herein to refer to a -heteroaryl- group, where heteroaryl is as described above, which is linked to two or more other groups. Exemplary groups include 2,5-furyl, 2,5-thienyl, 2,4-thiazolyl, 2,5-thiazolyl and 2,6-pyridyl.

Measurement Methods

Tensile Modulus

The Young's modulus of the lens materials were determined using a TA-XT2 Texture Analyser, and the value was obtained by drawing a tangent to the initial linear portion of the stress-strain curve, and dividing the tensile stress by the corresponding strain. Measurements were performed on films of 500 μm thickness prepared from the formulations and cut into 10 mm×50 mm samples.

Equilibrium Water Content

The Equilibrium Water Contents (EWC) of the prototype hydrogel lenses produced according to the present invention were determined by gravimetric means. The wet weight of lenses after equilibration in water at room temperature overnight was first measured. The lenses were then dried in an oven at 70° C. to a constant weight, which was the dry weight. The EWC of the lenses was then calculated as follows.

$$\text{EWC (wt \%)} = [(\text{wet weight} - \text{dry weight})/\text{wet weight}] * 100$$

Oxygen Permeability

The oxygen permeability (in barriers) of prototype lenses produced according to the method of the present invention was determined by the polargraphic method generally described in ISO 9913-1:1996(E).

MODES FOR CARRYING OUT THE INVENTION

The following examples describe the method of the present invention and polymers obtained using the method. These examples are intended to illustrate the invention and are not to be construed as being limitations thereon.

Example 1

General procedure for making polymer systems incorporating zwitterionic monomers: The formulation components indicated in the respective tables were mixed, filtered, degassed using argon and heated to 70° C. for 1 hr. to give the cross-linked polymer systems derived from the monomer/macromer feedstocks. It was often useful to pre-dissolve the zwitterionic monomer in a particular co-monomer to aid the dissolution process.

The abbreviations and corresponding full names of the components used in the examples are listed in Table 1 below.

TABLE 1

| Abbreviation | Full name |
|---|---|
| HEMA | 2-Hydroxyethylmethacrylate |
| VP | N-Vinylpyrrolidone |
| DMA | Dimethylacrylamide |
| GMA | Glycerol monomethacrylate |

TABLE 1-continued

| Abbreviation | Full name |
|---|---|
| MPC | 2-Methacryloyloxyethyl-2'-(trimethylammoniumethyl) phosphate, inner salt |
| NVP-PC | 2-(3-Oxyethyl-1-vinylpyrrolidin-2-one)-2'-(trimethyl-ammonium)-ethyl phosphate, inner salt |
| HENV-PC | 2-(Trimethylammonium) ethyl-2-(vinyloxycarbonylamino)-ethyl phosphate, inner salt |
| PEG-PC | Polyethyleneglycol monomethacrylate phosphorylcholine terminated |
| S-PC | MPC/PDMS/Bam pre-polymer with pendant methacrylate ($Pm_{50}MSi_{45}Bam_5$-IEM) |
| SIMA-PC | Poly(dimethylsiloxane), monomethacryloxypropyl substituted, [2-(trimethylammoniumethyl) phosphate, inner salt]-3'-oxypropyl terminated |
| SC1 | (3-Methacryloxy-2-hydroxypropoxy) propylbis-(trimethylsiloxy)methylsilane |
| SC2 | Monomethacryloxypropyl functional polydimethylsiloxane |
| SC3 | Di-methacryloxypropyl terminated polydimethylsiloxane |
| SC4 | Monomethacryloxypropyl terminated, polytrifluoropropyl-methyl-siloxane-symmetric |
| SC5 | 3-[Tris(trimethylsiloxy)silyl]propyl methacrylate |
| SC6 | Poly(dimethylsiloxane), monomethacryloxypropyl substituted, dihydroxypropyl terminated |
| EGDMA | Ethylene glycol dimethacrylate |
| PD16 | Bis(tert-butylcyclohexyl) peroxydicarbonate |

Example 2

Polymers incorporating the zwitterionic methacrylate monomer MPC made using the general method of example 1 are shown in Table 2.

TABLE 2

| | Components (wt %) | | | | | | | | | | | | | |
|---|---|---|---|---|---|---|---|---|---|---|---|---|---|---|
| Formulation | MPC | HEMA | VP | DMA | SC1 | SC2 | SC3 | SC4 | SC5 | SC6 | S-PC | GMA | EDGMA | PD16 |
| LN007/2/141 | 6.20 | 24.50 | 24.50 | 12.30 | 30.70 | | | | | | | | 0.70 | 1.00 |
| LN007/2/145 | 6.20 | 24.60 | 24.60 | 12.30 | 27.70 | 2.90 | | | | | | | 0.70 | 1.00 |
| LN007/2/155 | 8.80 | 24.60 | 24.60 | 10.80 | 29.50 | | | | | | | | 0.70 | 1.00 |
| LN007/2/156 | 6.20 | 24.60 | 24.60 | 13.30 | 27.70 | | 2.00 | | | | | | 0.70 | 1.00 |
| LN007/2/157 | 6.20 | 24.60 | 24.60 | 14.30 | 27.70 | | | 1.00 | | | | | 0.70 | 1.00 |
| LN007/2/53 | 4.94 | 83.95 | | | | | | | | | | 9.88 | 0.74 | 0.49 |
| LN007/2/63 | 4.94 | 83.95 | | 4.94 | | | | | | | | 4.94 | 0.74 | 0.49 |
| LN007/2/59 | 9.88 | 83.95 | | | | | | | | | | 4.94 | 0.74 | 0.49 |
| LN007/2/50 | 14.81 | 79.01 | | | | | | | | | | 4.94 | 0.74 | 0.49 |
| LN007/2/41 | 4.94 | 19.75 | 19.75 | 24.69 | | | | | 29.6 | | | | 0.74 | 0.49 |
| LN007/2/45 | 14.81 | 69.14 | 4.94 | 4.94 | | | | 4.94 | | | | | 0.74 | 0.49 |
| LN007/2/46 | 14.81 | 59.26 | 9.88 | 4.94 | | | | 9.88 | | | | | 0.74 | 0.49 |
| LN007/2/49 | 14.81 | 79.01 | | | | | | 4.94 | | | | | 0.74 | 0.49 |
| LN007/2/133 | 7.60 | 37.99 | 7.60 | 7.60 | 34.19 | | 3.80 | | | | | | 0.74 | 0.49 |
| LN007/2/136 | 11.3 | 22.52 | 15 | 7.5 | 33.8 | 7.5 | | | | | | | 1.46 | 0.98 |
| LN007/2/140 | 9.83 | 24.57 | 16.41 | 14.7 | 29.48 | 3.24 | | | | | | | 0.74 | 0.98 |
| LN007/2/150 | 9.83 | 24.57 | 24.57 | 9.83 | 29.5 | | | | | | | | 0.74 | 0.98 |
| LN007/2/151 | 14.74 | 24.57 | 19.66 | 9.83 | 29.48 | | | | | | | | 0.74 | 0.98 |
| LN007/2/131 | 8.23 | 41.16 | 8.23 | 8.23 | 28.81 | 4.12 | | | | | | | 0.74 | 0.49 |
| LN007/2/132 | 7.05 | 42.34 | 7.05 | 7.05 | 31.75 | 3.53 | | | | | | | 0.74 | 0.49 |
| LN007/2/134 | 8.23 | 41.16 | 8.23 | 8.23 | 28.81 | | 4.12 | | | | | | 0.74 | 0.49 |
| LN007/2/137 | 11.20 | 22.41 | 14.93 | 7.47 | 33.61 | 7.47 | | | | | | | 1.46 | 1.46 |
| LN007/2/138 | 11.15 | 22.3 | 14.86 | 7.43 | 33.45 | 7.43 | | | | | | | 1.45 | 1.93 |
| LN007/2/117 | 9.88 | 9.88 | 39.51 | 19.75 | 9.88 | 9.88 | | | | | | | 0.74 | 0.49 |
| LN007/2/118 | 9.88 | 9.88 | 39.51 | 19.75 | 9.88 | | 9.88 | | | | | | 0.74 | 0.49 |
| LN007/2/119 | 6.17 | 24.69 | 24.69 | 12.35 | 24.69 | 6.17 | | | | | | | 0.74 | 0.49 |
| LN007/2/142 | 7.38 | 29.32 | 29.32 | 14.66 | 14.07 | 3.54 | | | | | | | 0.74 | 0.98 |
| LN007/2/143 | 6.19 | 40.49 | 24.57 | 12.29 | 11.79 | 2.95 | | | | | | | 0.74 | 0.98 |
| LN007/2/144 | 6.19 | 24.57 | 40.49 | 12.29 | 11.79 | 2.95 | | | | | | | 0.74 | 0.98 |
| LN007/2/146 | 6.19 | 24.57 | 24.57 | 28.21 | 11.79 | 2.95 | | | | | | | 0.74 | 0.98 |
| LN007/2/165 | 14.74 | 34.4 | 9.83 | 9.83 | | | | | 9.83 | 19.7 | | | 0.74 | 0.98 |
| LN007/2/353 | 8.80 | 59.98 | | | 29.50 | | | | | | | | 0.74 | 0.74 |
| LN007/2/303 | 14.74 | 24.57 | | | 29.48 | | | | | | | 29.48 | 0.74 | 0.98 |
| LN007/2/304 | 14.74 | 34.4 | | | 29.48 | | | | | | | 19.66 | 0.74 | 0.98 |
| LN007/2/322 | 14.74 | 49.14 | | | 29.48 | | | | | | | 4.91 | 0.74 | 0.98 |
| LN007/2/326 | 14.74 | 53.07 | | | 29.48 | | | | | | | 0.98 | 0.74 | 0.98 |
| LN007/2/323 | 14.67 | 34.23 | | | 48.90 | | | | | | | | 0.73 | 1.47 |

TABLE 2-continued

| | Components (wt %) | | | | | | | | | | | | | |
|---|---|---|---|---|---|---|---|---|---|---|---|---|---|---|
| Formulation | MPC | HEMA | VP | DMA | SC1 | SC2 | SC3 | SC4 | SC5 | SC6 | S-PC | GMA | EDGMA | PD16 |
| LN007/2/29 | 4.99 | 23.94 | 15.96 | 24.94 | | | | | 28.9 | | | | 0.75 | 0.5 |
| LN007/2/30 | 9.88 | 23.7 | 5.93 | 24.69 | | | | | 34.6 | | | | 0.74 | 0.49 |
| LN007/2/31 | 9.88 | 19.75 | 4.94 | 29.63 | | | | | 34.6 | | | | 0.74 | 0.49 |
| LN007/2/32 | 5.01 | 24.06 | 16.04 | 25.06 | | | | | 29.1 | | | | 0.5 | 0.25 |
| LN007/2/33 | 14.81 | 44.44 | | | | | | | 39.5 | | | | 0.74 | 0.49 |
| LN007/2/34 | 14.81 | 64.2 | | | | | | | 19.8 | | | | 0.74 | 0.49 |
| LN007/2/44 | 4.99 | 23.94 | 15.96 | 24.94 | | | | | 28.9 | | | | 0.75 | 0.5 |
| LN007/2/54 | 9.88 | 79.01 | | | | | | | | 9.88 | | | 0.74 | 0.49 |
| LN007/2/60 | 4.94 | 88.89 | | | | | | | | 4.94 | | | 0.74 | 0.49 |
| LN007/2/89 | 4.25 | 17.20 | 4.25 | 12.85 | | 8.60 | | | 51.61 | | | | 0.74 | 0.49 |
| LN007/2/90 | 4.25 | 17.2 | 4.25 | 12.85 | | | | 8.6 | 51.61 | | | | 0.74 | 0.49 |
| LN007/2/91 | 12.33 | 24.67 | 43.22 | 16.08 | | 2.47 | | | | | | | 0.74 | 0.49 |
| LN007/2/92 | 0.93 | 28.09 | | 23.25 | | | 23.3 | | 23.25 | | | | 0.74 | 0.49 |
| LN007/2/93 | 0.18 | 31.55 | | 22.34 | | | | 22.3 | 22.34 | | | | 0.75 | 0.5 |
| LN007/2/99 | 5.41 | 32.77 | | | 5.41 | | | | 54.61 | | | | 0.80 | 1.00 |
| LN007/2/100 | 5.41 | 32.77 | | | | | | 5.41 | 54.61 | | | | 0.80 | 1.00 |
| LN007/2/70 | 3.50 | 14.01 | 14.01 | 14.01 | | | 14.01 | | 39.23 | | | | 0.74 | 0.49 |
| LN007/2/71 | 4.94 | 19.75 | 4.94 | 14.81 | | | 9.88 | | 44.44 | | | | 0.74 | 0.49 |
| LN007/2/120 | 5.49 | 21.95 | 21.95 | 10.97 | 32.92 | | | 5.49 | | | | | 0.74 | 0.49 |
| LN007/2/191 | 14.74 | 29.48 | | 14.74 | | | | | 39.31 | | | | 0.74 | 0.98 |
| LN007/2/152 | 6.19 | 24.57 | 24.57 | 12.29 | 27.71 | | | 2.95 | | | | | 0.74 | 0.98 |
| LN007/2/153 | 6.19 | 24.57 | 24.57 | 12.29 | 27.71 | | 2.95 | | | | | | 0.74 | 0.98 |
| LN007/2/148 | 6.19 | 15.43 | 15.23 | 12.29 | 49.14 | | | | | | | | 0.74 | 0.98 |
| LN007/2/149 | 6.19 | 15.43 | 5.41 | 2.46 | 68.8 | | | | | | | | 0.74 | 0.98 |
| LN007/2/154 | 7.86 | 24.57 | 24.57 | 11.79 | 29.48 | | | | | | | | 0.74 | 0.98 |
| LN007/2/158 | 14.74 | 34.4 | 16.71 | 16.71 | 15.72 | | | | | | | | 0.74 | 0.98 |
| LN007/2/159 | 15.00 | 23.30 | 20.00 | 20.00 | 20.00 | | | | | | | | 0.70 | 1.00 |
| LN007/2/160 | 15.00 | 58.30 | | 25.00 | | | | | | | | | 0.70 | 1.00 |
| LN007/2/161 | 15.00 | 63.30 | | 20.00 | | | | | | | | | 0.70 | 1.00 |
| LN007/2/162 | 14.70 | 19.70 | 24.60 | 24.60 | 14.70 | | | | | | | | 0.70 | 1.00 |
| LN007/2/168 | 14.74 | 29.48 | | 14.74 | | | | | 39.31 | | | | 0.74 | 0.98 |
| LN007/2/169 | 14.74 | 29.48 | | 24.57 | | | | | 29.48 | | | | 0.74 | 0.98 |
| LN007/2/166 | 14.74 | 24.57 | 19.66 | 9.83 | | | | | 29.48 | | | | 0.74 | 0.98 |
| LN007/2/167 | 14.74 | 24.57 | 9.83 | 9.83 | | | | | 39.31 | | | | 0.74 | 0.98 |
| LN007/2/170 | 14.74 | 44.23 | | | | | | | 39.31 | | | | 0.74 | 0.98 |
| LN007/2/171 | 9.83 | 44.23 | | | | | | | 44.23 | | | | 0.74 | 0.98 |
| LN007/2/173 | 4.91 | 24.57 | 19.66 | 14.74 | | | | | 34.40 | | | | 0.74 | 0.98 |
| LN007/2/174 | 11.79 | 24.57 | 9.83 | 22.6 | | | | | 29.48 | | | | 0.74 | 0.98 |
| LN007/2/175 | 4.91 | 46.68 | | | | | | | 46.68 | | | | 0.74 | 0.98 |
| LN007/2/209 | 4.91 | | | | | | | | 93.37 | | | | 0.74 | 0.98 |
| LN007/2/26 | 4.94 | 33.58 | 16.79 | 14.81 | | | | | 28.64 | | | | 0.74 | 0.49 |
| LN007/2/21 | 13.83 | 35.56 | 17.78 | 15.80 | | | | | 15.80 | | | | 0.74 | 0.49 |
| LN007/2/22 | 11.85 | 31.60 | 14.81 | 13.83 | | | | | 26.67 | | | | 0.74 | 0.49 |
| LN007/2/23 | 9.88 | 27.65 | 13.83 | 11.85 | | | | | 35.56 | | | | 0.74 | 0.49 |
| LN007/2/24 | 8.89 | 24.69 | 11.85 | 10.90 | | | | | 42.47 | | | | 0.74 | 0.49 |
| LN007/2/27 | 7.98 | 21.95 | 10.97 | 9.98 | | | | | 47.88 | | | | 0.75 | 0.50 |
| LN007/2/28 | 7.82 | 20.54 | 9.78 | 8.80 | | | | | 51.83 | | | | 0.73 | 0.49 |
| LN007/2/25 | 6.98 | 18.95 | 8.98 | 7.98 | | | | | 55.86 | | | | 0.75 | 0.50 |
| LN007/2/62 | 4.94 | 83.95 | 4.94 | | | | | | | | 4.94 | | 0.74 | 0.49 |
| LN007/2/382 | 8.67 | 14.88 | 24.46 | 10.64 | 39.67 | | | | | | | | 0.70 | 0.98 |
| LN008/30/14 | 11.14 | 17.22 | 22.28 | 9.11 | 38.48 | | | | | | | | 0.76 | 1.01 |
| LN008/30/15 | 7.86 | 24.57 | 24.57 | 11.79 | 26.54 | 2.95 | | | | | | | 0.74 | 0.98 |
| LN008/30/16 | 9.83 | 23.59 | 23.59 | 11.79 | 26.54 | 2.95 | | | | | | | 0.74 | 0.98 |
| LN008/30/17 | 10.03 | 35.09 | 8.02 | 8.02 | 34.09 | | 3.01 | | | | | | 0.75 | 1.00 |
| LN008/30/18 | 9.83 | 58.97 | | 24.57 | | | | | | | 4.91 | | 0.74 | 0.98 |
| LN008/30/62 | 8.28 | 20.00 | 10.00 | 10.00 | 40.00 | 10.00 | | | | | | | 0.74 | 0.98 |
| LN008/30/77 | 13.28 | 25.00 | 15.00 | | 40.00 | 5.00 | | | | | | | 0.74 | 0.98 |
| LN008/30/78 | 8.28 | 20.00 | 15.00 | | 45.00 | 10.00 | | | | | | | 0.74 | 0.98 |

Example 3

Polymers made using the general method of example 1 incorporating the reactive, zwitterionic pre-polymer S—PC are shown in Table 3.

TABLE 3

| Formulation | Components (wt %) | | | | | |
|---|---|---|---|---|---|---|
| | HEMA | VP | DMA | S-PC | EDGMA | PD16 |
| LN007/2/101 | 83.50 | 4.50 | 4.50 | 5.00 | 1.50 | 1.00 |
| LN007/2/102 | 78.50 | 4.50 | 9.50 | 5.00 | 1.50 | 1.00 |

Example 4

Polymers made using the general method of example 1 incorporating zwitterionic N-vinyl, O-vinyl and PEG methacrylate systems are shown in table 4.

TABLE 4

| Formulation | Components (wt %) | | | | | | | | | |
|---|---|---|---|---|---|---|---|---|---|---|
| | NVP-PC | HENV-PC | PEG-PC | HEMA | VP | DMA | SC1 | SC6 | EGDMA | PD16 |
| LN007/2/201 | 14.74 | 0 | 0 | 49.14 | 0 | 0 | 0 | 34.40 | 0.74 | 0.98 |
| LN007/2/202 | 19.66 | 0 | 0 | 44.23 | 0 | 0 | 0 | 34.40 | 0.74 | 0.98 |
| LN007/2/203 | 9.83 | 0 | 0 | 58.97 | 0 | 0 | 0 | 29.48 | 0.74 | 0.98 |
| LN007/2/204 | 4.91 | 0 | 0 | 63.88 | 0 | 0 | 0 | 29.48 | 0.74 | 0.98 |
| LN007/2/205 | 9.83 | 0 | 0 | 68.8 | 0 | 0 | 0 | 19.66 | 0.74 | 0.98 |
| LN007/2/206 | 4.91 | 0 | 0 | 73.71 | 0 | 0 | 0 | 19.66 | 0.74 | 0.98 |
| LN007/2/292 | 14.74 | 0 | 0 | 24.57 | 18.67 | 10.81 | 29.48 | 0 | 0.74 | 0.98 |
| LN007/2/354 | 9.83 | 0 | 0 | 58.97 | 0 | 0 | 29.48 | 0 | 0.74 | 0.98 |
| LN007/2/355 | 19.66 | 0 | 0 | 49.14 | 0 | 0 | 29.48 | 0 | 0.74 | 0.98 |
| LN007/2/214 | 8.85 | 0 | 0 | 24.57 | 24.57 | 10.81 | 29.48 | 0 | 0.74 | 0.98 |
| LN007/2/370 | 8.85 | 0 | 0 | 24.57 | 24.57 | 10.81 | 29.48 | 0 | 0.74 | 0.98 |
| LN007/2/231 | 0 | 0 | 9.83 | 39.31 | 9.83 | 9.83 | 0.00 | 29.48 | 0.74 | 0.98 |
| LN007/2/279 | 0 | 0 | 39.12 | 29.34 | 0.00 | 0.00 | 29.34 | 0.00 | 0.73 | 1.47 |
| LN007/2/280 | 0 | 0 | 29.34 | 39.12 | 0.00 | 0.00 | 29.34 | 0.00 | 0.73 | 1.47 |
| LN007/2/281 | 0 | 0 | 19.56 | 48.90 | 0.00 | 0.00 | 29.34 | 0.00 | 0.73 | 1.47 |
| LN007/2/235b | 0 | 0 | 8.75 | 24.47 | 24.47 | 10.74 | 29.34 | 0.00 | 0.75 | 1.49 |
| LN007/2/384 | 0 | 0 | 8.81 | 14.15 | 23.90 | 9.99 | 40.95 | 0.00 | 0.71 | 1.49 |

Example 5

Polymers made using the general method of example 1 incorporating the zwitterionic siloxane methacrylate monomer SIMA-PC are shown in table 5.

TABLE 5

| Formulation | Components (wt %) | | | | | | |
|---|---|---|---|---|---|---|---|
| | SIMA-PC | MPC | HEMA | VP | SC1 | EGDMA | PD16 |
| LN007/2/277 | 29.61 | 0 | 54.31 | 0 | 14.80 | 0.79 | 0.49 |
| LN007/2/289 | 14.80 | 0 | 64.21 | 0 | 19.70 | 0.79 | 0.49 |
| LN008/30/60 | 22.24 | 10.24 | 43.90 | 0 | 21.85 | 0.76 | 1.00 |
| LN007/2/333 | 9.83 | 4.91 | 58.97 | 9.83 | 14.74 | 0.74 | 0.98 |
| LN007/2/334 | 9.83 | 4.91 | 63.88 | 9.83 | 9.83 | 0.74 | 0.98 |
| LN007/2/335 | 9.83 | 9.83 | 58.97 | 9.83 | 9.83 | 0.74 | 0.98 |
| LN007/2/372 | 14.74 | 14.74 | 39.31 | 0 | 29.48 | 0.74 | 0.98 |
| LN007/2/347 | 14.74 | 0 | 58.97 | 9.83 | 14.74 | 0.74 | 0.98 |
| LN007/2/348 | 14.74 | 9.83 | 58.97 | 0 | 14.74 | 0.74 | 0.98 |
| LN007/2/389 | 9.71 | 14.57 | 39.69 | 0 | 34.32 | 0.72 | 1.00 |

Example 6

This example illustrates the general procedure (Table 6) for preparing polymerisable materials and corresponding contact lenses. Unless otherwise stated, all the materials were used as received.

Each component of the polymerisable system including the monomers, cross linker (EGDMA) and initiator (PD16) was weighed and added to a glass vial. The vials were sealed with a cap and then placed on a roller mixer at room temperature until all components were fully dissolved. After dissolution, the mixture was filtered through a 0.45 micron filter and the solution was de-oxygenated by gently bubbling dry argon gas through the formulation.

Polypropylene contact lens molds were cleaned by rinsing with 20% Decon 90 in water followed by drying in an oven at 70° C. for 30 min. The female molds were filled with the formulation and the male molds were added to the female molds. The molds were then placed in an oven preheated to 70° C. for 1 hour.

After cooling, the molds were immersed in purified water overnight to de-mold the lenses.

TABLE 6

| Description | Procedure |
|---|---|
| 1. Mixing | weigh components used to form the polymerisable solution into a glass vial<br>seal the vial with a lid<br>place on a roller-mixer at room temperature until fully dissolved, filter through 0.45micron membrane and de-oxygenate |
| 2. Preparation and filling the molds | rinse the plastic molds with 20% Decon 90 in water<br>dry the molds in an oven at 70° C. for 30 min<br>fill the molds with the polymerisable solution and close |
| 3. Polymerization | preheat the oven to 70° C.<br>place the material-containing molds in the oven for 1 hr and then allow to cool for 30 mins |
| 4. Hydration and Demolding | place the lenses/molds in purified water<br>open the molds and leave overnight<br>remove the lenses from the molds |

Example 7

A number of materials were evaluated as components of contact lens formulations.

Using MPC in combination with other components produced clear hydrated lenses. The compositions are listed in Table 7.

TABLE 7

| Formulation | MPC | HEMA | VP | DMA | SC1 | SC2 | SC3 | S-PC | EDGMA | PD16 |
|---|---|---|---|---|---|---|---|---|---|---|
| LN007/2/141 | 6.20 | 24.50 | 24.50 | 12.30 | 30.70 | | | | 0.70 | 1.00 |
| LN007/2/145 | 6.20 | 24.60 | 24.60 | 12.30 | 27.70 | 2.90 | | | 0.70 | 1.00 |
| LN007/2/155 | 8.80 | 24.60 | 24.60 | 10.80 | 29.50 | | | | 0.70 | 1.00 |
| LN007/2/156 | 6.20 | 24.60 | 24.60 | 13.30 | 27.70 | | 2.00 | | 0.70 | 1.00 |
| LN007/2/157 | 6.20 | 24.60 | 24.60 | 14.30 | 27.70 | | 1.00 | | 0.70 | 1.00 |
| LN007/2/53 | 4.94 | 83.95 | | | | | | 9.88 | 0.74 | 0.49 |
| LN007/2/63 | 4.94 | 83.95 | | 4.94 | | | | 4.94 | 0.74 | 0.49 |
| LN007/2/59 | 9.88 | 83.95 | | | | | | 4.94 | 0.74 | 0.49 |
| LN007/2/50 | 14.81 | 79.01 | | | | | | 4.94 | 0.74 | 0.49 |
| LN007/2/367 | 8.80 | 19.48 | 24.45 | 10.74 | 34.79 | | | | 0.75 | 0.99 |

Components (wt %)

Example 8

The appearance of polymerisable solutions, polymerized solutions and hydrated contact lenses were assessed by visual inspection. Flexibility and elasticity of the hydrated lenses were evaluated manually by gentle folding and stretching.

The results are shown in Table 8.

TABLE 8

| Formulations | before polymerisation | after polymerisation | after hydration | Physical properties |
|---|---|---|---|---|
| LN007/2/141 | Clear | Clear | Clear | Flexible |
| LN007/2/145 | Clear | Clear | Clear | Flexible |
| LN007/2/155 | Clear | Clear | Clear | Elastic |
| LN007/2/156 | Clear | Clear | Clear | Elastic |
| LN007/2/157 | Clear | Clear | Clear | Flexible |
| LN007/2/53 | Clear | Clear | Clear | Elastic |
| LN007/2/63 | Clear | Clear | Clear | Elastic |
| LN007/2/59 | Clear | Clear | Clear | Elastic |
| LN007/2/367 | Clear | Clear | Clear | Elastic |

Example 9

Equilibrium water content (EWC) of certain of the lenses were determined by gravimetric means. The wet weight of lenses after equilibration in water at room temperature overnight was first measured. The lenses were then dried in an oven at 70° C. to a constant weight, which was the dry weight. Water content of the lenses was calculated as follows.

EWC (wt %)=[(wet weight−dry weight)/wet weight] *100

Table 9 displays EWC of the prototype PC silicone hydrogel contact lenses.

TABLE 9

| Sample | Equilibrium water content/% (n = 3) |
|---|---|
| LN007/2/141 | 48.85 ± 0.76 |
| LN007/2/145 | 44.18 ± 0.45 |
| LN007/2/155 | 53.30 ± 0.72 |
| LN007/2/156 | 47.60 ± 0.44 |
| LN007/2/157 | 48.85 ± 0.86 |
| LN007/2/53 | 46.38 ± 0.55 |
| LN007/2/63 | 49.47 ± 2.57 |
| LN007/2/59 | 50.18 ± 0.26 |
| LN007/2/50 | 60.24 ± 2.35 |
| LN007/2/367 | 52.29 ± 1.50 |

Example 10

The Young's modulus of certain of the lens materials was measured using a TA-XT2 Texture Analyser, and the value was obtained by drawing a tangent to the initial linear portion of the stress-strain curve, and dividing the tensile stress by the corresponding strain. Films of 500 μm thickness were prepared from the formulations and cut into 10 mm×50 mm samples for the measurement.

Two of the prototype PC silicone hydrogel contact lens materials were tested and the results are listed in Table 10.

TABLE 10

| Sample | Modulus/MPa (n = 3) |
|---|---|
| LN007/2/155 | 0.62 ± 0.17 |
| LN007/2/156 | 0.62 ± 0.13 |

Example 11

Similarly to example 7 a number of materials incorporating novel zwitterionic monomers were evaluated as components of contact lens formulations.

Certain of the compositions and their properties are listed in Tables 11a and 11b.

TABLE 11a

| Formulation | NVP-PC | HEVC-PC | HEMA | VP | DMA | SC1 | EGDMA | PD16 | Hydrogel appearance |
|---|---|---|---|---|---|---|---|---|---|
| LN007/2/207 | 9.83 | 0 | 88.45 | 0 | 0 | 0 | 0.74 | 0.98 | clear |
| LN007/2/208 | 19.66 | 0 | 78.62 | 0 | 0 | 0 | 0.74 | 0.98 | clear |
| LN007/2/213 | 15.71 | 0 | 83.05 | 0 | 0 | 0 | 0.75 | 0.49 | clear |
| LN007/2/354 | 9.83 | 0 | 58.97 | 0 | 0 | 29.48 | 0.74 | 0.98 | clear |
| LN007/2/355 | 19.66 | 0 | 49.14 | 0 | 0 | 29.48 | 0.74 | 0.98 | clear |
| LN007/2/214 | 8.85 | 0 | 24.57 | 24.57 | 10.81 | 29.48 | 0.74 | 0.98 | clear |
| LN007/2/215 | 7.85 | 0 | 90.91 | 0 | 0 | 0 | 0.75 | 0.49 | clear |
| LN007/2/370 | 8.85 | 0 | 24.57 | 24.57 | 10.81 | 29.48 | 0.74 | 0.98 | clear |

TABLE 11b

| Formulation | Before polymerisation | After polymerisation | After hydration | Physical properties | Water content (%) |
|---|---|---|---|---|---|
| LN007/2/207 | clear | clear | clear | flexible | nd |
| LN007/2/208 | clear | clear | clear | flexible | nd |
| LN007/2/213 | clear | clear | clear | flexible | 58.3 |
| LN007/2/354 | clear | clear | clear | brittle | 32.59 |
| LN007/2/355 | clear | clear | clear | brittle | 42.59 |
| LN007/2/214 | clear | clear | clear | flexible | 38.5 |
| LN007/2/215 | clear | clear | clear | flexible | 47.7 |
| LN007/2/370 | clear | clear | clear | flexible | 40.92 |

Example 12

Similarly to example 7, a number of materials incorporating the PC-siloxane methacrylate macromer SIMA-PC were evaluated as components of contact lens formulations.

Certain of the compositions and their properties are listed in Tables 12a and 12b.

TABLE 12a

| Formulation | SIMA-PC | MPC | HEMA | VP | SC1 | EGDMA | PD16 | Hydrogel clarity |
|---|---|---|---|---|---|---|---|---|
| LN007/2/277 | 29.61 | | 54.31 | | 14.80 | 0.79 | 0.49 | slightly hazy |
| LN007/2/289 | 14.80 | | 64.21 | | 19.70 | 0.79 | 0.49 | clear |
| LN008/30/60 | 22.24 | 10.24 | 43.90 | | 21.85 | 0.76 | 1.00 | clear |
| LN007/2/333 | 9.83 | 4.91 | 58.97 | 9.83 | 14.74 | 0.74 | 0.98 | clear |
| LN007/2/334 | 9.83 | 4.91 | 63.88 | 9.83 | 9.83 | 0.74 | 0.98 | clear |
| LN007/2/335 | 9.83 | 9.83 | 58.97 | 9.83 | 9.83 | 0.74 | 0.98 | clear |
| LN007/2/372 | 14.74 | 14.74 | 39.31 | | 29.48 | 0.74 | 0.98 | clear |
| LN007/2/347 | 14.74 | | 58.97 | 9.83 | 14.74 | 0.74 | 0.98 | clear |
| LN007/2/348 | 14.74 | 9.83 | 58.97 | | 14.74 | 0.74 | 0.98 | clear |
| LN007/2/389 | 9.71 | 14.57 | 39.69 | | 34.32 | 0.72 | 1.00 | clear |

TABLE 12b

| Formulation | Before polymerisation | After polymerisation | After hydration | Physical properties | Water content (%) |
|---|---|---|---|---|---|
| LN007/2/277 | clear | slightly hazy | slightly hazy | flexible | nd |
| LN007/2/289 | clear | clear | clear | flexible | 26.79 |
| LN008/30/60 | clear | clear | clear | flexible | 34.87 |
| LN007/2/333 | clear | clear | clear | flexible | 37.84 |
| LN007/2/334 | clear | clear | clear | flexible (weak) | 41.67 |
| LN007/2/335 | clear | clear | clear | flexible (weak) | 52.05 |
| LN007/2/372 | clear | clear | clear | flexible (weak) | 45.78 |
| LN007/2/347 | clear | clear | clear | flexible | 32.81 |
| LN007/2/348 | clear | clear | clear | flexible | 43.34 |
| LN007/2/389 | clear | clear | clear | flexible | 26.79 |

Example 13

Preparation of 2-(3-oxyethyl-1-vinylpyrrolidin-2-one)-2'-(trimethylammonium)-ethyl phosphate, inner salt (HEVP-PC)

The reactions carried out in Example 13 are summarised in Scheme 1 below:

Scheme 1

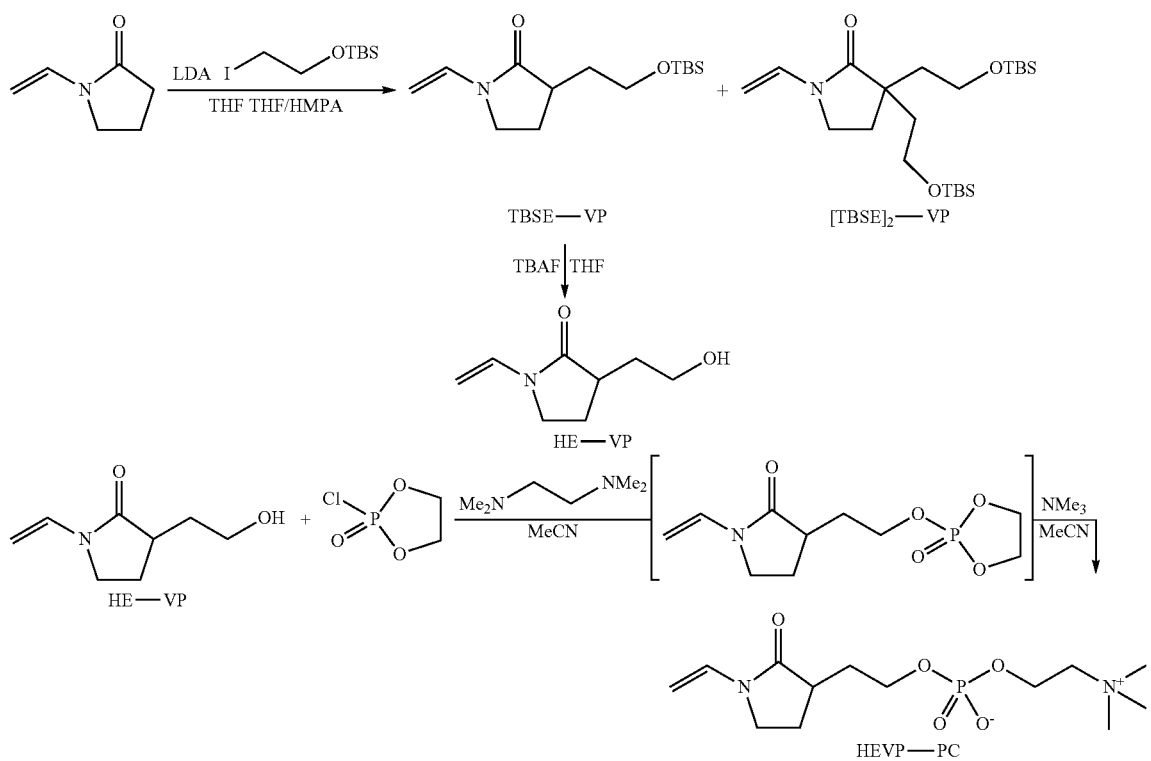

(i) Preparation of (2-iodoethoxy)-tert-butyldimethylsilane

To a stirred solution of 2-iodoethanol (17.2 g; 100 mmol) and imidazole (8.17 g; 120 mmol) in dichloromethane (100 mL) was added tert-butyldimethylsilyl chloride (15.83 g; 105 mmol) at such a rate that the reaction temperature did not rise above 30° C. Upon complete addition the solution was left stirring for 17 h, then washed with water (2×50 mL) and brine (50 mL) and dried over $MgSO_4$. Evaporation of the solvent afforded the target compound (28.0 g; 97.8 mmol; 98%) as a colourless liquid.

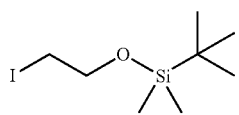

$C_8H_{19}IOSi$ (M = 286.23 g/mol)

$^1$H-NMR (400 MHz) ($CDCl_3$): δ=3.83 (t, 2H, J=7.0 Hz), 3.83 (t, 2H, J=7.0 Hz), 3.20 (t, 2H, J=7 Hz), 0.90 (s, 9H), 0.08 (s, 6H) ppm.

ii) Preparation of 3-[2-(tert-butyldimethylsilanyloxy)-ethyl]-1-vinylpyrrolidin-2-one (TBSE-VP To a stirred ice-cold solution of diisopropylamine (0.46 mL; 3.3 mmol; 1.1 equiv.) in dry tetrahydrofuran (20 mL) was dropwise added a 2.5 M solution of n-butyllithium (1.32 mL; 3.3 mmol; 1.1 equiv.) under an argon atmosphere. Upon complete addition the solution was left stirring for 10 min and then cooled to around −80 to −70° C. 1-vinylpyrrolidin-2-one (0.32 mL; 3.0 mmol) was added dropwise and the solution was left stirring for 20 min. Hexamethylphosphoramide (0.57 mL; 3.3 mmol; 1.1 equiv.) was added and the solution left stirring for further 20 min. To the solution was dropwise added (2-iodoethoxy)-tert-butyldimethylsilane (859 mg; 3.0 mmol) and the solution was left stirring at around −80 to −70° C. for 17 h. The reaction mixture was warmed to ambient temperature and quenched with a saturated aqueous solution of $NH_4Cl$ (15 mL). The aqueous phase was extracted with diethyl ether (2×15 mL), the combined organic extracts were dried over $MgSO_4$ and concentrated under reduced pressure. Column chromatography (ethyl acetate/petroleum ether (b.p. 40-60° C.)=1:9) afforded by-product 3,3-bis-[2-(tert-butyldimethylsilanyloxy)-ethyl]-1-vinylpyrrolidin-2-one ([TBSE] 2-VP) (49 mg; 0.115 mmol; 4%) as a colourless liquid. Further elution with ethyl acetate/petroleum ether (b.p. 40-60° C.) (1:4) afforded the target compound 3-[2-(tert-butyldimethylsilanyloxy)-ethyl]-1-vinylpyrrolidin-2-one (TBSE-VP) (621 mg; 2.30 mmol; 77%) as a colourless liquid.

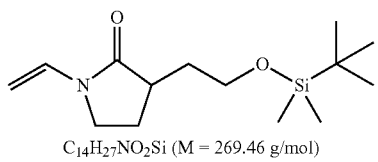

$C_{14}H_{27}NO_2Si$ (M = 269.46 g/mol)

$^1$H-NMR (400 MHz) ($CD_3OD$): δ=7.01 (dd, 1H, —CH=$CH_2$, $J_{cis}$=9.1 Hz, $J_{trans}$=16.0 Hz), 4.53 (d, 1H, =$CH_2$, $J_{trans}$=16.0 Hz), 4.49 (d, 1H, =$CH_2$, =9.1 Hz), 3.83-3.70 (m, 2H, —$CH_2$O—), 3.57 (td, 1H, —$CH_2$N—, J=9.9 Hz, 3.0 Hz), 3.48-3.40 (m, 1H, —$CH_2$N—), 2.76-2.65 (m, 1H, —CH—(C=O)—), 2.39-2.28 and 1.90-1.79 (2×m, 2H, —CH₂—CH₂N—), 2.10-2.00 and 1.63-1.52 (2×m, 2H, —CH₂—CH₂O—), 0.90 (s, 9H, —C(CH₃)₃), 0.07 (s, 6H, —Si(CH₃)₂—) ppm.

iii) Preparation of 3-(2-hydroxyethyl)-1-vinylpyrrolidin-2-one (HE-VP

To a stirred and ice-cold solution of 3-[2-(tert-butyldimethylsilanyloxy)-ethyl]-1-vinylpyrrolidin-2-one (TBSE-VP) (269 mg; 1.0 mmol) in dry tetrahydrofuran (10 mL) was dropwise added a 1.0 M solution of tetrabutylammonium fluoride (2.0 mL; 2.0 mmol; 2.0 equiv.) under an argon atmosphere. Upon completion of the addition the reaction mixture was left stirring at 0° C. for 5 min, allowed to warm to ambient temperature over 5 min and left stirring for another 40 min. The reaction mixture was partitioned between water (5 mL) and ethyl acetate (10 mL) and the aqueous phase was extracted with ethyl acetate (3×5 mL). The combined organic extracts were dried over MgSO₄ and concentrated under reduced pressure. Column chromatography (ethyl acetate) afforded the target compound (135 mg; 0.87 mmol; 87%) as a pale yellow liquid.

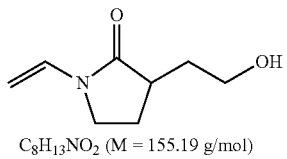

C₈H₁₃NO₂ (M = 155.19 g/mol)

¹H-NMR (400 MHz) (CD₃OD): δ=7.02 (dd, 1H, —CH=CH₂, $J_{cis}$=9.1 Hz, $J_{trans}$=16.0 Hz), 4.54 (d, 1H, =CH₂, $J_{trans}$=16.0 Hz), 4.50 (d, 1H, —CH₂, $J_{cis}$=9.1 Hz), 3.75-3.62 (m, 2H, —CH₂O—), 3.59 (td, 1H, —CH₂N—, J=9.8 Hz, 3.0 Hz), 3.44 (dt, 1H, —CH₂N—, J=10.2 Hz, 8.2 Hz), 2.70 (qd, 1H, —CH—(C=O)—, J=9.1 Hz, 5.0 Hz), 2.36 (dddd, 1H, —CH₂—CH₂N—, J=15.7 Hz, 8.8 Hz, 7.9 Hz, 2.9 Hz), 2.06 (dddd, 1H, —CH₂—CH₂O—, J=19.1 Hz, 7.8 Hz, 6.6 Hz, 5.0 Hz), 1.80 (ddd, 1H, —CH₂—CH₂N—, J=17.8 Hz, 12.8 Hz, 9.2 Hz), 1.56 (ddt, 1H, —CH₂—CH₂O—, J=13.8 Hz, 9.2 Hz, 5.7 Hz) ppm.

iv) Preparation of 2-(3-oxyethyl-1-vinylpyrrolidin-2-one)-2'-(trimethylammonium)-ethyl phosphate, inner salt (HEVP-PC To a stirred and chilled (−10° C.) solution of 2-chloro-2-oxo-1,3,2-dioxaphospholane (4.58 g; 32.1 mmol; 1.04 equiv.) in acetonitrile (3 g) was dropwise added a solution of 3-(2-hydroxyethyl)-1-vinylpyrrolidin-2-one (4.80 g; 30.9 mmol) and N,N,N',N'-tetramethylethylenediamine (1.98 g; 17.1 mmol; 0.55 equiv.) in acetonitrile (7 g). Upon completion of the addition the reaction mixture was left stirring for 15 min, filtered under an argon atmosphere and the N,N,N',N'-tetramethylethylenediaminedihydrochloride precipitate washed with dry acetonitrile (7 g) to give a filtrate comprising a solution of 2-(3-oxyethyl-1-vinylpyrrolidin-2-one)-2-oxo-1,3,2-dioxapholane in acetonitrile.

To the stirred and chilled phospholane solution was added 4-methoxyphenol (4 mg; 0.029 mmol), acetonitrile (30 g) and trimethylamine (3.7 g; 62.6 mmol; 2.02 equiv.) and the reaction mixture was heated in a closed system (water condenser fitted with balloon) at 70° C. for 19 h. The reaction mixture was concentrated (ca. 10 to 20 mL of acetonitrile and excess trimethylamine removed) under vacuum and the product allowed to crystallise out of solution at 5° C. and allowed to warm to ambient temperature.

The crystalline product was filtered under argon atmosphere, successively washed with acetonitrile (6 mL) and ethyl acetate (3×6 mL) and dried in vacuo at ambient temperature to afford 2.95 g of a white powder comprising the target compound (2.83 g; 8.83 mmol; 29%) and residual acetonitrile (0.12 g; 2.94 mmol).

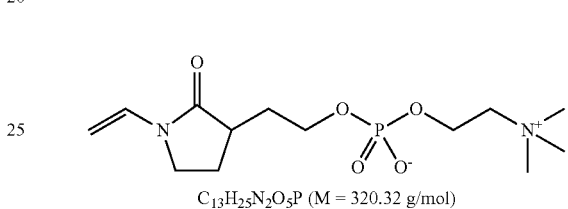

C₁₃H₂₅N₂O₅P (M = 320.32 g/mol)

¹H-NMR (400 MHz) (CD₃OD): δ=7.01 (dd, 1H, —CH=CH₂, $J_{cis}$=9.1 Hz, $J_{trans}$=16.0 Hz), 4.54 (d, 1H, =CH₂, $J_{trans}$=16.0 Hz), 4.49 (d, 1H, =CH₂, $J_{cis}$=9.1 Hz), 4.31-4.23 (m, 2H, —OCH₂—CH₂N⁺—), 4.10-3.93 (m, 2H, —CH—CH₂—CH₂O—), 3.67-3.62 (m, 2H, —CH₂N⁺—), 3.62-3.55 and 3.49-3.40 (2×m, 2H, —CH₂N—), 3.23 (s, 9H, —N⁺(CH₃)₃), 2.81-2.72 (m, 1H, —CH—(C=O)—), 2.39-2.28 and 1.90-1.79 (2×m, 2H, —CH₂—CH₂N—), 2.10-2.00 and 1.63-1.52 (2×m, 2H, —CH—CH₂—CH₂O—) ppm. ¹³C-NMR (100 MHz) (CD₃OD): δ=176.39 (—(C=O)—), 129.38 (—CH=CH₂), 95.00 (=CH₂), 66.69 (—CH₂N⁺—), 63.86 and 63.80 (—CH—CH₂—CH₂O—), 59.56 and 59.51 (—OCH₂—CH₂N⁺—), 53.91, 53.87 and 53.81 (—N⁺(CH₃)₃), 43.47 (—CH₂N—), 39.90 (—CH—(C=O)—), 32.51 and 32.42 (—CH—CH₂—CH₂O—), 24.82 (—CH₂—CH₂N—) ppm. ³¹P-NMR (162 MHz) (CD₃OD): δ=−0.14 ppm. HRMS (ESI) for C₁₃H₂₆N₂O₅P [M+H]⁺: calculated: 321.1574

Example 14

Preparation of 2-(trimethylammonium)ethyl-2-(vinyloxycarbonylamino)ethyl phosphate, inner salt (HEVC-PC)

The reactions carried out in Example 14 are summarised in Scheme 2 below:

Scheme 2

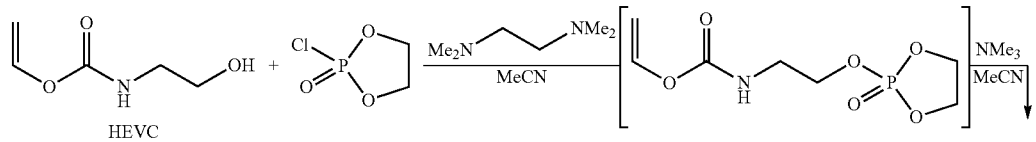

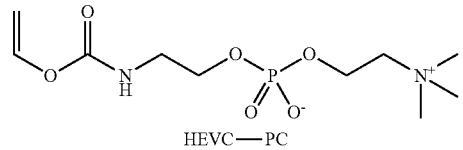
HEVC—PC

To a stirred and chilled (−10° C.) solution of 2-chloro-2-oxo-1,3,2-dioxaphospholane (5.00 g; 35.1 mmol) in acetonitrile (3 g) was dropwise added a solution of N-hydroxyethyl-O-vinylcarbamate (HEVC) (4.60 g; 35.1 mmol) and N,N,N',N'-tetramethylethylenediamine (2.24 g; 19.3 mmol; 0.55 equiv.) in acetonitrile (7.5 g). Upon completion of the addition the reaction mixture was left stirring for 1 h, filtered under an argon atmosphere and the N,N,N',N'-tetramethylethylenediamine dihydrochloride precipitate washed with dry acetonitrile (8 g) to give a filtrate comprising a solution of 2-(N-oxyethyl-O-vinylcarbamate)-2-oxo-1,3,2-dioxaphospholane in acetonitrile.

To the stirred and chilled phospholane solution was added 4-methoxyphenol (20 mg; 0.161 mmol), acetonitrile (35 g) and trimethylamine (3.67 g; 61.4 mmol; 1.75 equiv.) and the reaction mixture was heated in a closed system (water condenser fitted with balloon) at 70° C. for 17 h. The reaction mixture was concentrated (ca. 10 mL of acetonitrile and excess trimethylamine removed) under vacuum and the product allowed to crystallise out of solution at around −25° C.

The crystalline product was rapidly filtered and dried in vacuo at ambient temperature to afford the target compound (1.08 g; 3.65 mmol; 10%) as an off-white solid.

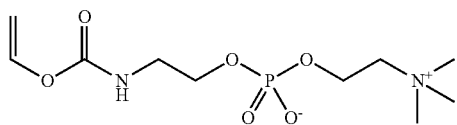
$C_{10}H_{21}N_2O_6P$ (M = 296.26 g/mol)

$^1$H-NMR (400 MHz) (CD$_3$OD): δ=7.16 (dd, 1H, —CH=CH$_2$, $J_{cis}$=6.3 Hz, $J_{trans}$=14.0 Hz), 4.71 (dd, 1H, =CH$_2$, $J_{gem}$=1.4 Hz, $J_{trans}$=14.0 Hz), 4.41 (dd, 1H, =CH$_2$, $J_{gem}$=1.4 Hz, $J_{cis}$=6.3 Hz), 4.32-4.23 (m, 2H, —OCH$_2$—CH$_2$N$^+$—), 3.93 and 3.91 (2×t, 2H, —NH—CH$_2$—CH$_2$O—, J=5.5 Hz), 3.68-3.60 (m, 2H, —CH$_2$N$^+$—), 3.37 (t, 2H, —NH—CH$_2$—, J=5.5 Hz), 3.22 (s, 9H, —N$^+$(CH$_3$)$_3$) ppm. $^{31}$P-NMR (162 MHz) (CD$_3$OD): δ=−0.12 ppm.

Example 15

The Preparation of poly(dimethylsiloxane), monomethacryloxypropyl substituted, [2-(trimethylammoniumethyl) phosphate, inner salt]-3'-oxypropyl terminated (SIMA-PC) (m+n≈5; avg. M≈990 g/mol)

The reactions carried out in Example 15 are summarised in Scheme 3 below:

Scheme 3

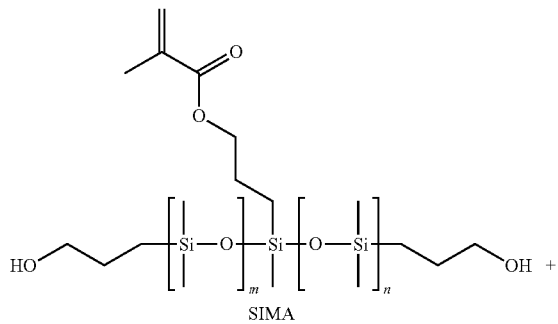
SIMA
+

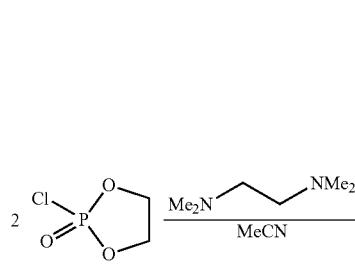
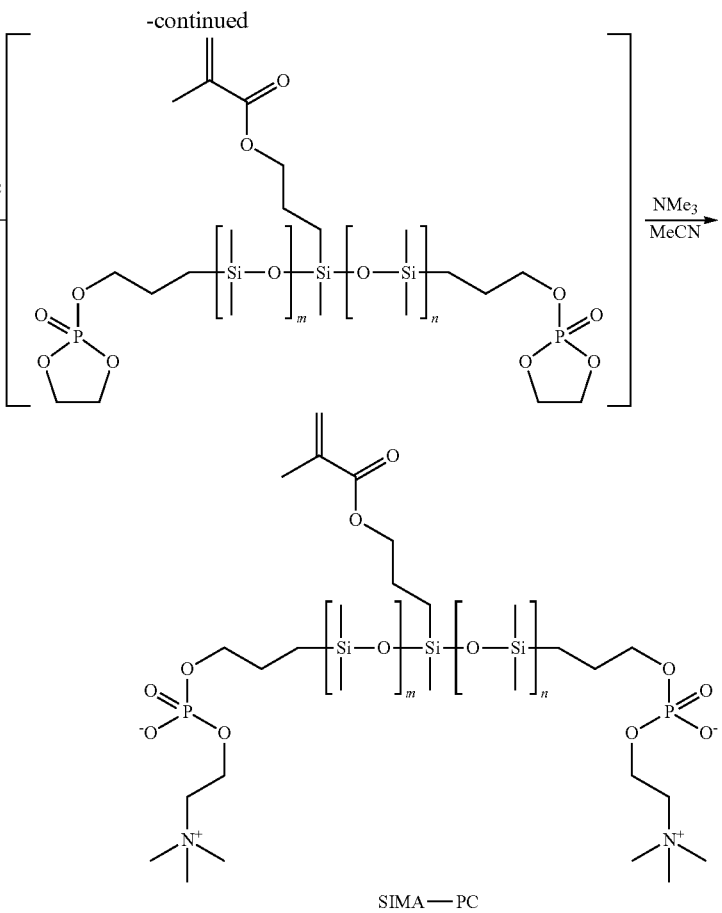

SIMA—PC

To a stirred and chilled (−10° C.) solution of 2-chloro-2-oxo-1,3,2-dioxaphospholane (19.77 g; 139 mmol; 2.0 equiv.) in acetonitrile (24 g) was dropwise added a solution of poly (dimethylsiloxane), monomethacryloxypropyl substituted, hydroxypropyl terminated (SIMA) (45.80 g; avg. M≈660 g/mol; 69.4 mmol) and N,N,N',N'-tetramethylethylenediamine (8.47 g; 72.9 mmol; 1.05 equiv.) in acetonitrile (60 g). Upon completion of the addition the reaction mixture was left stirring for 15 min, filtered under an argon atmosphere and the N,N,N',N'-tetramethylethylenediamine dihydrochloride precipitate washed with dry acetonitrile (90 g) to give a filtrate comprising a solution of the intermediate bis-dioxaphospholane in acetonitrile.

To the stirred and chilled phospholane solution was added 2,6-di-tert-butyl-4-methylphenol (BHT) (30 mg; 0.136 mmol), acetonitrile (260 g) and trimethylamine (14.4 g; 243 mmol; 3.5 equiv.) and the reaction mixture was heated in a closed system (water condenser fitted with balloon) at 70° C. for 17 h. The reaction mixture was concentrated (ca. 100 mL of acetonitrile and excess trimethylamine removed) under vacuum and the product allowed to crystallise out of solution at around −25° C.

The crystalline product was rapidly filtered under argon atmosphere and dried in vacuo at ambient temperature to afford the target compound (16.30 g; 16.5 mmol; 24%) ($R_f$ (MeOH)=0.02) as a white solid (m.p. 215-220° C.). Average composition: $C_{34}H_{82}N_2O_{15}P_2Si_6$ (avg. M≈989.48 g/mol).

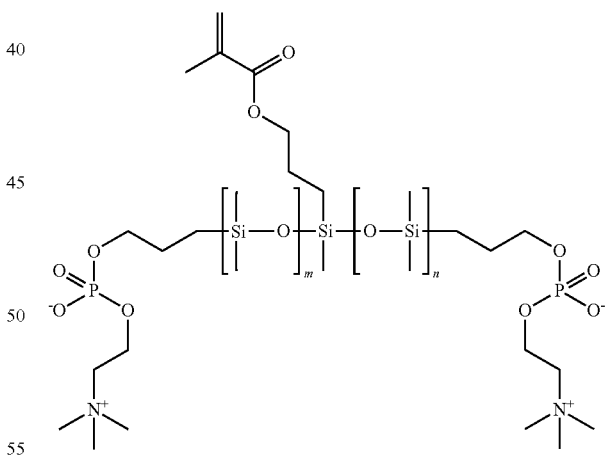

$^1$H-NMR (400 MHz) (CD$_3$OD): δ=6.08 (s, 1H, =CH$_2$), 5.64-5.58 (m, 1H, =CH$_2$), 4.30-4.19 (m, 4H, —OCH$_2$—CH$_2$N$^+$—), 4.14-4.07 (m, 2H, —(C=O)—O—CH$_2$—), 3.84 and 3.82 (2×t like 1×q, 4H, —O—($^-$O—)P(=O)—O—CH$_2$—CH$_2$—CH$_2$—Si—, J=6.7 Hz), 3.67-3.60 (m, 4H, —CH$_2$N$^+$—), 3.25, 3.24 and 3.22 (3×s, 18H, —N$^+$(CH$_3$)$_3$), 1.93 (s, 3H, —C(CH$_3$)=CH$_2$), 1.80-1.61 (m, 6H, —Si—CH$_2$—CH$_2$—), 0.65-0.51 (m, 6H, —Si—CH$_2$—), 0.14-0.04 (m, 33H, —Si—CH$_3$) ppm. $^{31}$P-NMR (162 MHz) (CD$_3$OD): δ=−0.08 ppm.

Example 16
The Preparation of (3-methacryloxy-2-[trimethylammoniumethyl]-phosphate, inner salt, propoxy)propyl-bis(trimethylsiloxy)methylsilane The reactions carried out in Example 16 are summarised in Scheme 4 below:

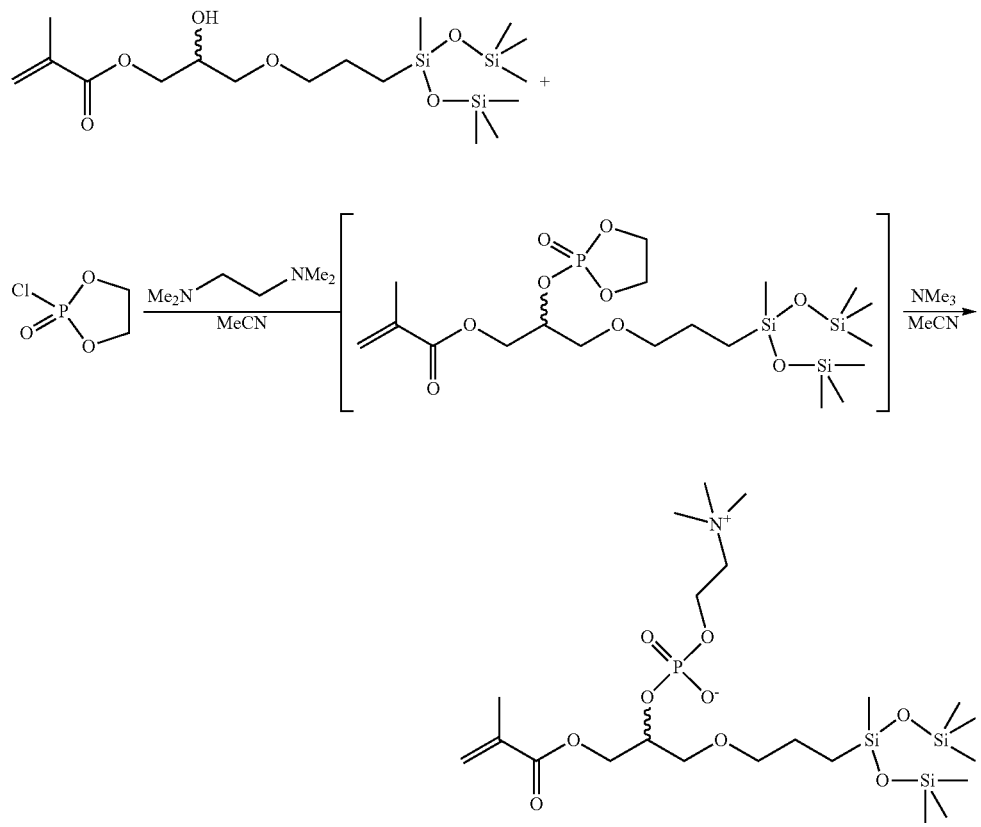

To a stirred and chilled (−10° C.) solution of 2-chloro-2-oxo-1,3,2-dioxaphospholane (2.10 g; 14.8 mmol; 1.25 equiv.) in acetonitrile (1.0 g) was added dropwise a solution of (3-methacryloxy-2-hydroxypropoxy)propyl-bis(trimethylsiloxy)methylsilane (5.00 g; 11.8 mmol) and N,N,N',N'-tetramethylethylenediamine (0.91 g; 7.81 mmol; 0.66 equiv.) in acetonitrile (3.0 g). Upon completion of the addition the reaction mixture was left stirring for 17 h, filtered under an argon atmosphere and the precipitate washed with dry acetonitrile (3.0 g) to give a filtrate comprising a solution of the intermediate dioxaphospholane in acetonitrile.

To the stirred and chilled phospholane solution was added 2,6-di-tert-butyl-4-methylphenol (BHT) (3 mg; 14 μmol), acetonitrile (11 g) and trimethylamine (1.4 g; 23.7 mmol; 2.00 equiv.) and the reaction mixture was heated in a closed system (water condenser fitted with balloon) at 70° C. for 24 h. The reaction mixture was concentrated (ca. 5 mL of acetonitrile and excess trimethylamine removed) under vacuum and the product allowed to crystallise out of solution at around −25° C.

The crude product was recrystallised from acetonitrile (2 ml), rapidly filtered under an argon atmosphere, washed with acetonitrile (1 ml) and ethyl acetate (3×1 ml) and dried in vacuo at ambient temperature to afford the target compound (1.9 g; 3.2 mmol; 27%) as a white solid.

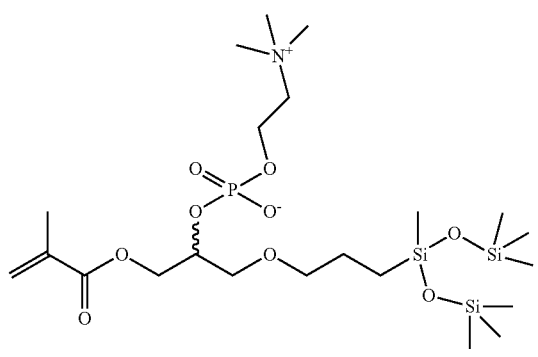

$C_{22}H_{50}NO_9PSi_3$ (M = 587.86 g/mol)

$^1$H-NMR (400 MHz) (CD$_3$OD): δ=6.14 (s, 1H, =CH$_2$), 5.67-5.62 (m, 1H, =CH$_2$), 4.55-4.46 (m, 1H), 4.46-4.39 (m, 1H), 4.35-4.22 (m, 3H, —OCH$_2$—CH$_2$N$^+$— and 1 more H), 4.14-3.99 (m, 1H), 3.70-3.60 (m, 4H, —CH$_2$N$^+$— and 2 more H), 3.45 (t, 2H, —O—CH$_2$—CH$_2$—CH$_2$—Si—, J=6.9 Hz), 3.22 (s, 9H, —N$^+$(CH$_3$)$_3$), 1.95 (s, 3H, —C(CH$_3$)=CH$_2$), 1.66-1.52 (m, 2H, —CH$_2$—CH$_2$—Si—), 0.52-0.43 (m, 2H, —CH$_2$—Si—), 0.10 (2×s, 18H, —Si(CH$_3$)$_3$), 0.04-0.00 (m, 3H, —Si(CH$_3$)(OMe$_3$)$_2$ ppm. $^{31}$P-NMR (162 MHz) (CD$_3$OD): δ=−1.39, −2.03 ppm.

What is claimed is:

1. A method comprising dissolving an ethylenically unsaturated zwitterionic monomer in a co-monomer system comprising a functionalised ethylenically unsaturated monomer in which the zwitterionic monomer is soluble, a siloxane group-containing monomer, and a crosslinking agent, to produce a homogeneous polymerisable solution, wherein the siloxane group-containing monomer is a material of formula (A) or (B):

  (A)

  (B)

wherein

T$^1$ is a polymerisable group;

Y$^1$ and Y$^2$ are each independently a linker group selected from the group consisting of a bond, C$_{1-12}$ alkylene, C$_{2-12}$ alkenylene, C$_{2-12}$ alkenylene, C$_{3-12}$ cycloalkylene, C$_{3-12}$ cycloalkenylene, C$_{2-12}$ heteroalkenylene, C$_{2-12}$ heteroalkynylene, arylene, heteroarylene, —C(O)—C$_{1-12}$ alkylene, —C(S)—C$_{1-12}$ alkylene, —C(O)O—C$_{1-12}$ alkylene, —C(O)S—C$_{1-12}$ alkylene, —C(O)N(R$^M$)—C$_{1-12}$ alkylene, —C(S)—C$_{1-12}$ alkylene, —C(S)O—C$_{1-12}$ alkylene, —C(S)S—C$_{1-12}$ alkylene, —C(S)N(R$^M$)—C$_{1-12}$ alkylene, —(CH$_2$)$_{qq}$(OCH$_2$CH$_2$)$_{rr}$— and —(CH$_2$CH$_2$O)$_{rr}$(CH$_2$)$_{qq}$—, wherein R$^M$ is hydrogen or C$_{1-4}$ alkyl, qq is an integer from 1 to 10, rr is an integer from 1 to 10, wherein one or more carbon atoms in the C$_{1-12}$ alkylene group may be optionally replaced with a heteroatom selected from the group consisting of S and O and the alkylene, alkenylene, alkynylene, cycloalkylene, cycloalkenylene, heteroalkenylene, heteroalkynylene, arylene and heteroarylene groups may be optionally substituted with one or more R$^N$, wherein each R$^N$ is independently selected from the group consisting of —H, —OH, —CN, —NO$_2$, —CF$_3$, —OCF$_3$, —CO$_2$H, —NH$_2$, C$_1$-C$_{10}$ alkyl, C$_2$-C$_{10}$ alkenyl, C$_2$-C$_{10}$ alkynyl, —O(C$_1$-C$_{10}$ alkyl), —O(C$_2$-C$_{10}$ alkenyl), —O(C$_2$-C$_{10}$ alkynyl), halogen, —C(O)H, —C(O)—(C$_1$-C$_{10}$ alkyl), —C(O)—O(C$_1$-C$_{10}$ alkyl), —NH(C$_1$-C$_{10}$ alkyl), —N(C$_1$-C$_{10}$ alkyl)$_2$, —C(O)—NH(C$_1$-C$_{10}$ alkyl), —C(O)—N(C$_1$-C$_{10}$ alkyl)$_2$, —NH—C(O)—(C$_1$-C$_{10}$ alkyl), —NH(C$_1$-C$_{10}$ alkyl)-C(O)—(C$_1$-C$_{10}$ alkyl), —NH—S(O)$_2$—(C$_1$-C$_{10}$ alkyl), —NH—(C$_1$-C$_{10}$ alkyl)-S(O)$_2$—(C$_1$-C$_{10}$ alkyl), —(C$_0$-C$_{10}$)—SH, —S(O)—(C$_1$-C$_{10}$ alkyl), —S(O)$_2$—(C$_1$-C$_{10}$ alkyl), —S(O)$_2$—NH$_2$, —S(O)$_2$—NH—(C$_1$-C$_{10}$ alkyl), —S(O)$_2$—N(C$_1$-C$_{10}$ alkyl)$_2$ and =O;

Y$^3$ is a linker group;

R$^{24}$ is a C$_{1-12}$ alkyl group which may be optionally substituted with one or more R$^N$;

G$^1$ is a siloxane group-containing component;

Z is a zwitterionic group;

k is an integer from 1 to 10;

l is an integer from 1 to 3;

u is an integer from 1 to 3; and v is an integer from 1 to 3.

2. The method of claim 1, wherein the ethylenically unsaturated zwitterionic monomer is a monomer of formula (I):

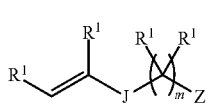  (I)

wherein:

J is selected from the group consisting of a valence bond;

—W—X—Y—, wherein W is (CR$^1_2$)$_n$; X is O, S or NR$^2$ and Y is a linker group; and —K—X—Y—, wherein K is (CR$^1_2$)$_n$C(O) and X and Y are as defined above;

Z is a zwitterionic group;

each R$^1$ is independently selected from H, halogen or C$_{1-4}$ alkyl;

R$^2$ is H or C$_{1-4}$ alkyl;

n is an integer from 0 to 6; and m is an integer from 0 to 6.

3. The method of claim 2, wherein the ethylenically unsaturated zwitterionic monomer is a monomer of formula (ID):

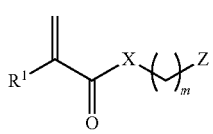  (ID)

4. The method of claim 3, wherein R$^1$ is methyl, X is O and m is 2.

5. The method of claim 2, wherein Z is a group of formula (IVB):

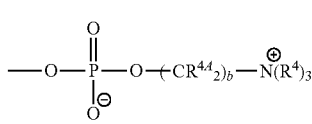  (IVB)

wherein each R$^4$ and R$^{44}$ is independently selected from hydrogen and C$_{1-4}$ alkyl and b is an integer from 1 to 4.

6. The method of claim 1, wherein the ethylenically unsaturated zwitterionic monomer is a monomer of formula (III):

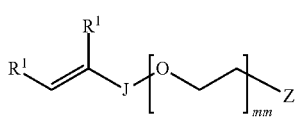  (III)

wherein J is selected from the group consisting of a valence bond;

—W—X—Y—, wherein W is (CR$^1_2$)$_n$; X is O, S or NR and Y is a linker group; and —K—X—Y—, wherein K is (CR$^1_2$)$_n$C(O) and X and Y are as defined above;

Z is a zwitterionic group;

each R$^1$ is independently selected from H, halogen or C$_{1-4}$ alkyl;

R$^2$ is H or C$_{1-4}$ alkyl;

n is an integer from 0 to 6; and mm is an integer from 1 to 20.

7. The method of claim 1, wherein the ethylenically unsaturated zwitterionic monomer is 2-methacryloyloxyethyl-2'-(trimethylammoniumethyl)phosphate inner salt (MPC).

8. The method of claim 1, wherein the functionalised ethylenically unsaturated monomer in which the zwitterionic monomer is soluble is HEMA or GMA.

9. The method of claim 8, wherein the functionalised ethylenically unsaturated monomer in which the zwitterionic monomer is soluble is HEMA.

10. The method of claim 1, wherein the co-monomer system further comprises one or more components selected from the group consisting of hydrophilic monomers, macromers, UV absorbers, tinting agents, antibacterial agents, therapeutic agents, pigments, diluents and combinations thereof.

11. The method of claim 10, wherein the co-monomer system further comprises a hydrophilic monomer.

12. The method of claim 11, wherein the hydrophilic monomer is selected from the group consisting of dimethylacrylamide, 2-hydroxyethylmethacrylate and N-vinylpyrollidone.

13. The method of claim 1, wherein the ethylenically unsaturated zwitterionic monomer is included in an amount such that the ratio of ethylenically unsaturated zwitterionic monomer to siloxane group-containing monomer or macromer in the polymerisable solution is about 0.1 to about 5.

14. The method of claim 1, wherein the ethylenically unsaturated zwitterionic monomer is pre-dissolved in the functionalised ethylenically unsaturated monomer in which it is soluble prior to mixing with the siloxane group-containing monomer or macromer and the crosslinking agent.

15. The method of claim 1, wherein the method comprises a further step of polymerising the homogeneous polymerisable solution.

16. The method of claim 15 comprising a further step of hydrating the polymer obtained after polymerisation.

17. A polymer obtainable by the method of claim 15.

18. A xerogel comprising the polymer of claim 17, which is free from water.

19. A silicone hydrogel comprising the polymer of claim 17, and water in an amount of 30 to 80% by weight of hydrogel.

20. The polymer of claim 17, which has an equilibrium water content in the range from 30 to 50%.

21. The polymer of claim 17, which has a modulus in the range from 0.5 to 1.0 MPa.

22. An article comprising the polymer of claim 17.

23. The article of claim 22, which is a contact lens.

24. The contact lens of claim 23, which has an oxygen permeability of about 30 barriers or more.

25. The contact lens of claim 23, which has an equilibrium water content in the range from 30 to 50%.

26. The method of claim 1, wherein the co-monomer system further comprises a non-reactive diluent.

27. The method of claim 26, wherein the non-reactive diluent is water or an alcohol.

28. The method of claim 26, wherein the method comprises a further step of removing the non-reactive diluent after the homogeneous polymerisable solution has been polymerised.

29. A homogeneous polymerisable solution produced by the method of claim 1.

* * * * *

UNITED STATES PATENT AND TRADEMARK OFFICE
CERTIFICATE OF CORRECTION

| | | |
|---|---|---|
| PATENT NO. | : 8,980,956 B2 | Page 1 of 1 |
| APPLICATION NO. | : 13/601067 | |
| DATED | : March 17, 2015 | |
| INVENTOR(S) | : Michael Driver et al. | |

It is certified that error appears in the above-identified patent and that said Letters Patent is hereby corrected as shown below:

In the claims

In Claim 6, Col. 54, Line 58, immediately after "wherein W is $(CR^1_2)_n$;" and immediately before "and Y is" please delete "X is O, S or NR" and insert -- X is O, S or $NR^2$ -- therefor.

Signed and Sealed this
Thirteenth Day of October, 2015

Michelle K. Lee
*Director of the United States Patent and Trademark Office*